US012794890B2

(12) United States Patent
Cho et al.

(10) Patent No.: US 12,794,890 B2
(45) Date of Patent: Nov. 10, 2026

(54) ELECTRONIC DEVICE FOR OPERATING SECURITY DEVICE, AND OPERATING METHOD THEREOF

(71) Applicant: Samsung Electronics Co., Ltd., Suwon-si (KR)

(72) Inventors: Donghyun Cho, Suwon-si (KR); Yongje Lee, Suwon-si (KR); Yungyu Gim, Suwon-si (KR); Eunsang Jang, Suwon-si (KR); Seungjoo Na, Suwon-si (KR); Rakyoung Yoon, Suwon-si (KR); Inchul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 18/758,607

(22) Filed: Jun. 28, 2024

(65) Prior Publication Data

US 2024/0356924 A1 Oct. 24, 2024

Related U.S. Application Data

(63) Continuation of application No. PCT/KR2023/000055, filed on Jan. 3, 2023.

(30) Foreign Application Priority Data

Jan. 14, 2022 (KR) ........................ 10-2022-0006075
Sep. 15, 2022 (KR) ........................ 10-2022-0116036

(51) Int. Cl.
*H04L 29/06* (2006.01)
*H04L 9/40* (2022.01)

(52) U.S. Cl.
CPC ............ *H04L 63/10* (2013.01); *H04L 63/062* (2013.01)

(58) Field of Classification Search
CPC ....... H04L 63/10; H04L 63/062; G06F 21/60; G06F 21/604; G06F 21/62; G06F 21/6209; G06F 21/6218
See application file for complete search history.

(56) References Cited

U.S. PATENT DOCUMENTS 8,286,188 B1 10/2012 Brief
8,332,653 B2 12/2012 Buer
(Continued)

FOREIGN PATENT DOCUMENTS

CN 106899545 A 6/2017
CN 113449331 B * 12/2021 ............. G06F 21/74
(Continued)

OTHER PUBLICATIONS

European Search Report dated Feb. 24, 2025, issued in European Application No. 23740377.9.
(Continued)

*Primary Examiner* — Malcolm Cribbs
(74) *Attorney, Agent, or Firm* — Jefferson IP Law, LLP

(57) ABSTRACT

An apparatus and a method for operating a security device in an electronic device are provided. The electronic device includes an application processor, a communication processor, a security subsystem configured to process a security function, an authority assignment device configured to assign authority to access the security subsystem to the application processor or the communication processor, and a processor key management device configured to provide the security subsystem with a first key related to the application processor or a second key related to the communication processor assigned the authority to access the security subsystem from the authority assignment device, wherein the security subsystem is configured to process a security function related to the application processor or the communication processor by using the first key or the second key
(Continued)

provided from the processor key management device, based on the authority assignment device assigning the authority to access the security subsystem to the application processor or the communication processor, and initialize data related to the application processor or the communication processor, based on returning the authority to access the security subsystem assigned to the application processor or the communication processor.

20 Claims, 21 Drawing Sheets

(56) References Cited

U.S. PATENT DOCUMENTS

| | | | |
|---|---|---|---|
| 8,589,667 B2 | 11/2013 | Mujtaba et al. | |
| 9,864,879 B2 | 1/2018 | Coker et al. | |
| 10,044,510 B2 | 8/2018 | Kwon et al. | |
| 10,050,936 B2 | 8/2018 | Roberson | |
| 10,229,271 B2 | 3/2019 | Kim | |
| 11,126,753 B2 | 9/2021 | Zhu et al. | |
| 11,157,623 B2 | 10/2021 | Pappachan et al. | |
| 11,212,674 B2 | 12/2021 | Park | |
| 11,743,201 B1 * | 8/2023 | Azulay | H04L 47/6215 370/235 |
| 2009/0150631 A1 * | 6/2009 | Wilsey | G06F 21/74 711/163 |
| 2016/0112454 A1 | 4/2016 | Lee et al. | |
| 2016/0255079 A1 * | 9/2016 | Harrison | H04L 9/0894 713/2 |
| 2017/0214662 A1 | 7/2017 | Chu et al. | |
| 2018/0006999 A1 | 1/2018 | Doukhvalov et al. | |
| 2018/0173662 A1 | 6/2018 | Cho et al. | |
| 2018/0191706 A1 * | 7/2018 | Hobson | G06F 21/60 |
| 2020/0285781 A1 | 9/2020 | Zhu et al. | |
| 2021/0318814 A1 | 10/2021 | Kim et al. | |
| 2023/0069047 A1 | 3/2023 | Feng et al. | |

FOREIGN PATENT DOCUMENTS

| | | |
|---|---|---|
| JP | 2017-163581 A | 9/2017 |
| KR | 10-0646350 B1 | 11/2006 |
| KR | 10-2016-0046114 A | 4/2016 |
| KR | 10-2016-0056382 A | 5/2016 |
| KR | 10-2016-0101635 A | 8/2016 |
| KR | 10-2019-0039603 A | 4/2019 |
| KR | 10-2019-0131712 A | 11/2019 |

OTHER PUBLICATIONS

International Search Report dated Mar. 31, 2023, issued in International Application No. PCT/KR2023/000055.

Indian Office Action dated Jan. 19, 2026, issued in an Indian Patent Application No. 202417053297.

* cited by examiner

ELECTRONIC DEVICE FOR OPERATING SECURITY DEVICE, AND OPERATING METHOD THEREOF

CROSS-REFERENCE TO RELATED APPLICATION(S)

This application is a continuation application, claiming priority under § 365(c), of an International application No. PCT/KR2023/000055, filed on Jan. 3, 2023, which is based on and claims the benefit of a Korean patent application number 10-2022-0006075, filed on Jan. 14, 2022, in the Korean Intellectual Property Office, and of a Korean patent application number 10-2022-0116036, filed on Sep. 15, 2022, in the Korean Intellectual Property Office, the disclosure of each of which is incorporated by reference herein in its entirety.

BACKGROUND

1. Field

The disclosure relates to an electronic device for operating a security device and an operating method thereof.

2. Description of Related Art

With the development of information and communication technology and semiconductor technology, an electronic device is capable of providing various functions. For example, the various functions may include at least one of a call function, a message function, a broadcast function, a wireless Internet function, a camera function, an electronic payment function, a user authentication function, or a music playback function.

As a user uses a variety of functions through an electronic device, an increasing amount of personal information is stored in the electronic device. For example, the personal information stored on the electronic device may include information that requires security configuration, such as payment information, authentication information, and/or information related to credentials.

The above information is presented as background information only to assist with an understanding of the disclosure. No determination has been made, and no assertion is made, as to whether any of the above might be applicable as prior art with regard to the disclosure.

SUMMARY

An electronic device may include a security device, such as a security subsystem, to enhance the security of the electronic device. For example, when an application processor (AP) and a communication processor (CP) are physically separated, the electronic device may include a first security subsystem for the application processor and a second security subsystem for the communication processor. The first security subsystem for the application processor and the second security subsystem for the communication processor may perform the same function. For example, the application processor and the communication processor that are physically separated may include states of being configured in different chips.

When an electronic device uses a plurality of security subsystems that perform the same function to strengthen the security of the electronic device, an internal space of the electronic device may be required to dispose the security subsystems. Further, as the electronic device uses the plurality of security systems, the unit cost of the electronic device may increase and power consumption may increase.

Aspects of the disclosure are to address at least the above-mentioned problems and/or disadvantages and to provide at least the advantages described below. Accordingly, an aspect of the disclosure is to provide a device and a method for sharing a security device (e.g., a security subsystem) among a plurality of processors (e.g., an application processor and a communication processor) in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes an application processor, a communication processor, a security subsystem configured to process a security function related to the application processor or the communication processor, an authority assignment device configured to assign authority to access the security subsystem to the application processor or the communication processor, and a processor key management device configured to provide the security subsystem with a first key related to the application processor or a second key related to the communication processor, based on the application processor or the communication processor assigned the authority to access the security subsystem from the authority assignment device, wherein the security subsystem is configured to process a security function related to the application processor or the communication processor by using the first key or the second key provided from the processor key management device, based on the authority assignment device assigning the authority to access the security subsystem to the application processor or the communication processor, and initialize data related to the application processor or the communication processor, based on returning the authority to access the security subsystem assigned to the application processor or the communication processor.

In accordance with another aspect of the disclosure, an operating method of an electronic device including an application processor and a communication processor is provided. The operating method includes assigning, by an authority assignment device of the electronic device, authority to access a security subsystem configured to process a security function related to the application processor or the communication processor to the application processor or the communication processor, obtaining, from a processor key management device of the electronic device, a key related to the application processor or the communication processor in case of assigning the authority to access the security subsystem to the application processor or the communication processor, processing a security function related to the application processor or the communication processor through the security subsystem, based on the key related to the application processor or the communication processor, and initializing data related to the application processor or the communication processor, based on returning the authority to access the security subsystem assigned to the application processor or the communication processor.

In accordance with another aspect of the present disclosure, one or more non-transitory computer-readable storage media storing one or more computer programs including computer-executable instructions that, when executed by one or more processors of an electronic device individually or collectively, cause the electronic device to perform operations are provided. The operations include assigning authority to access a security subsystem configured to process a security function to an application processor of the electronic device or a communication processor of the electronic device, obtaining a key related to the application processor or the communication processor in case of assigning the authority to access the security subsystem to the application processor or the communication processor, processing a security function related to the application processor or the communication processor through the security subsystem, based on the key related to the application processor or the communication processor, and initializing data related to the application processor or the communication processor, based on returning the authority to access the security subsystem assigned to the application processor or the communication processor.

According to various embodiments of the disclosure, a plurality of processors (e.g., an application processor and a communication processor) may share one security device (e.g., a security subsystem) in an electronic device, thereby reducing a physical area for disposing the security device and reducing the unit cost of the electronic device and/or power consumption due to the security device.

According to various embodiments, the electronic device may manage time for which at least one processor among the plurality of processors sharing the security device occupies the security device, thereby providing security for use of the security device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
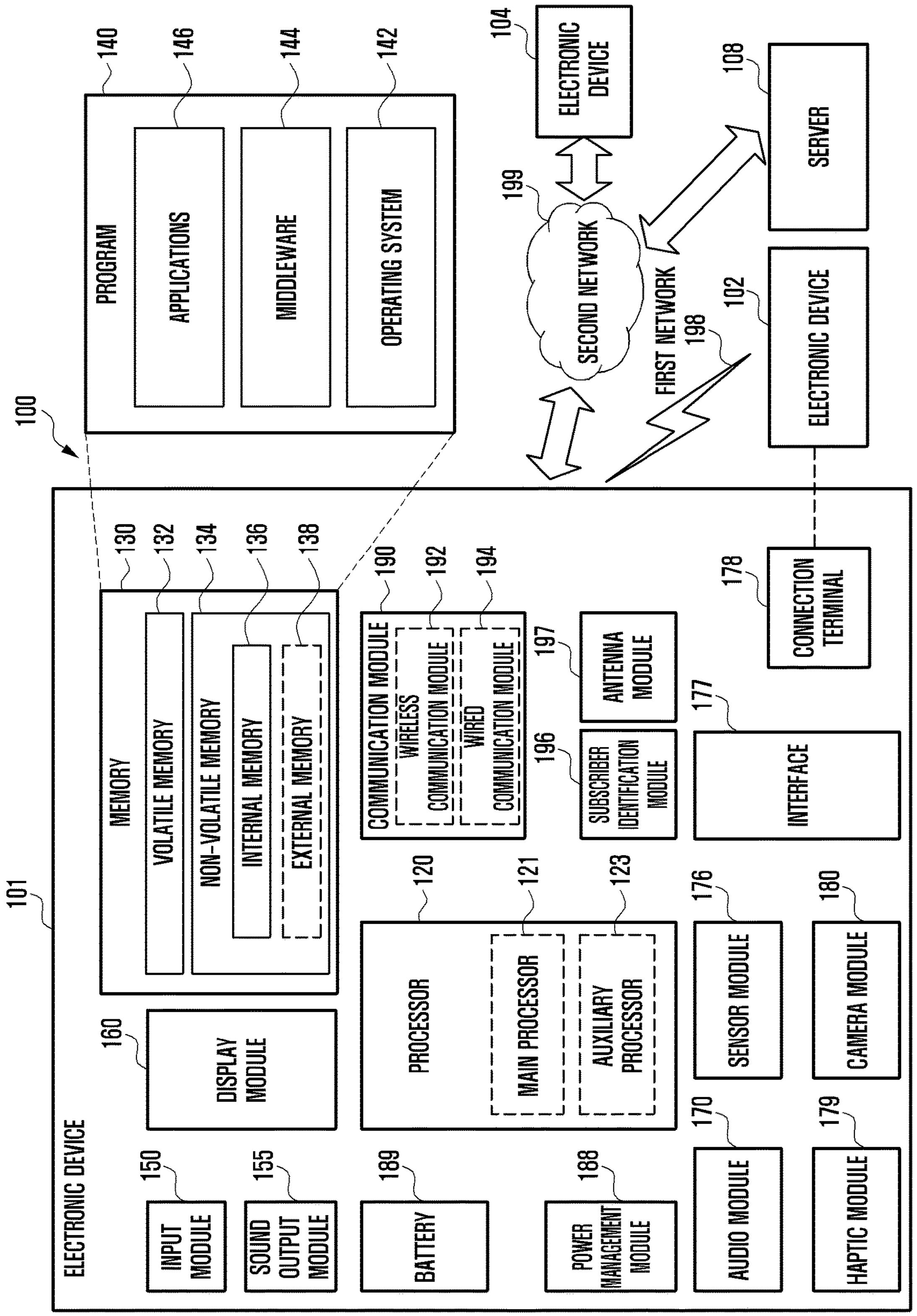
FIG. 1 is a block diagram of an electronic device in a network environment according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to various embodiments, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include patch array antennas and/or dipole array antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
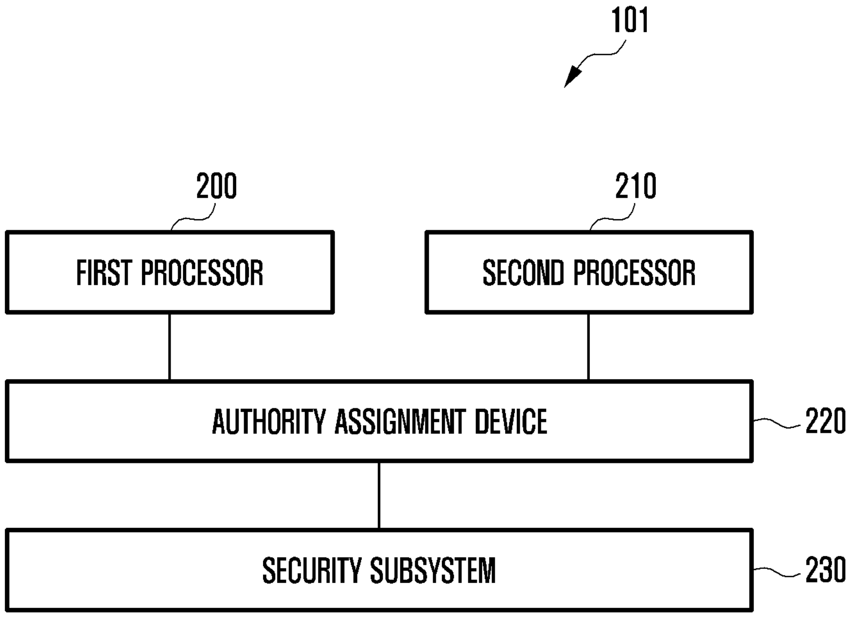
FIG. 2A is a block diagram of an electronic device for providing a security function according to an embodiment of the disclosure.
Figure 2B:
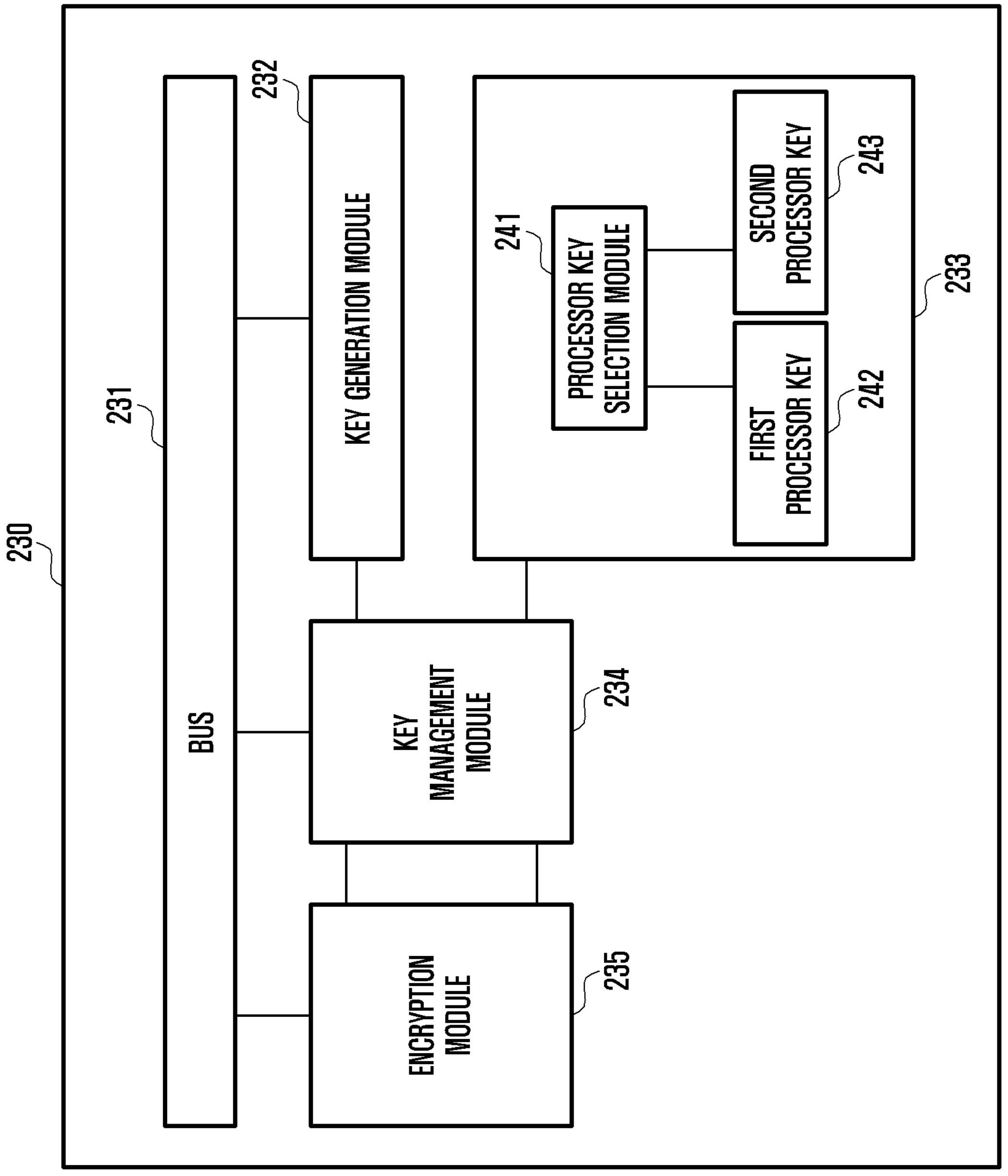
FIG. 2B is a block diagram of a security device according to an embodiment of the disclosure.

FIG. 2A is a block diagram of an electronic device 101 for providing a security function according to an embodiment of the disclosure. FIG. 2B is a block diagram of a security device (e.g., a security subsystem 230) according to an embodiment of the disclosure.

Referring to FIG. 2A, the electronic device 101 may include the security subsystem 230 as a security device for executing a security function. However, the security device is not limited to the security subsystem 230, and may include other devices for executing the security function of the electronic device 101.

Referring to FIGS. 2A and 2B, the electronic device 101 may include a first processor 200, a second processor 210, an authority assignment device 220, and/or the security subsystem 230. The first processor 200 may be substantially the same as the processor 120 or the main processor 121 of FIG. 1, or may include the processor 120 or the main processor 121. The second processor 210 may be substantially the same as the processor 120 or the coprocessor 123 (e.g., the communication processor) of FIG. 1, or may include the processor 120 or the coprocessor 123. The first processor 200 and/or the second processor 210 may be operatively, functionally, and/or electrically connected to the authority assignment device 220 (or authority assignment circuitry) and/or the security subsystem 230. The first processor 200 and the second processor 210 may be separated physically or in hardware. The first processor 200, the second processor 210, the authority assignment device 220, and/or the security subsystem 230 may be included in one package. The first processor 200, the second processor 210, the authority assignment device 220, and/or the security subsystem 230 may be included in a plurality of packages (e.g., processor packages).

The first processor 200 may control at least one component (e.g., the second processor 210) of the electronic device 101 operatively, functionally, and/or electrically connected to the first processor 200, and/or process (or operate on) various data. For example, the first processor 200 may include an application processor (AP). For example, the first processor 200 may include a memory (not shown). For example, the memory of the first processor 200 may include a flash memory.

When there is at least one job related to the security function, the first processor 200 may transmit a request signal related to authority of access to the security subsystem 230 to the authority assignment device 220. When the first processor 200 is assigned the authority of the access to the security subsystem 230 from the authority assignment device 220, the first processor 200 may perform the security function related to the at least one task through the security subsystem 230. For example, the first processor 200 may store the result (e.g., an encryption key) of performing the security function provided from the security subsystem 230 in the memory of the first processor 200. In one example, the security function may include at least one of generation of a signature on data related to the job, a check for the signature on the data related to the job, authentication related to the job, generation of an authentication certificate of the data related to the job, a check for the authentication certificate of the data related to the job, encryption of the data related to the job, decryption of the data related to the job, or generation of an encryption key related to the job. When the at least one job corresponding to the request signal related to the authority of the access through the security subsystem 230 is complete, the first processor 200 may return (or give back) the authority of the access to the security subsystem 230. For example, the first processor 200 may transmit a request signal related to return of the authority of the access to the authority assignment device 220.

The second processor 210 may process (or operate on) data related to communication of the electronic device 101. The second processor 210 may include one communication processor, or may include a plurality of communication processors separated in hardware or software. For example, the plurality of communication processors may support network communications related to different types of radio access technologies (RATs). For example, the second processor 210 may include memory (not shown). For example, the memory of the second processor 210 may include a flash memory.

When there is at least one job related to the security function, the second processor 210 may transmit a request signal related to authority of access to the security subsystem 230 to the authority assignment device 220. When the second processor 210 is assigned the authority of the access to the security subsystem 230 from the authority assignment device 220, the first processor 200 may perform the security function related to the at least one task through the security subsystem 230. For example, the second processor 210 may store the result (e.g., encrypted data) of performing the security function provided from the security subsystem 230 in the memory of the second processor 210. In one example, the security function may include at least one of generation of a signature on data related to the job, a check for the signature on the data related to the job, authentication related to the job, generation of an authentication certificate of the data related to the job, a check for the authentication certificate of the data related to the job, encryption of the data related to the job, decryption of the data related to the job, or generation of an encryption key related to the job. In one example, the data related to the job may include at least one of an international mobile equipment identity (IMEI), a mobile equipment identifier (MEID), a Dual SIM (DS) IMEI, network lock information, subscriber identity module (SIM) lock information, IMEI CERT (e.g., certificate or certification) information, regional information, business operator information, deliberation operator information, NCK (e.g., network lock, network unlock code or network control key), SPCK (e.g., service provider lock or service provider control key), MCK (e.g., unfreeze or unfreeze code), or personal identification number (PIN) information, a network lock password, a password, business operator network information, network information, an allowed mobile country code (MCC)/MCK list, code division multiple access (CDMA) information, or radio frequency (RF) band information.

When the at least one job corresponding to the request signal related to the authority of the access through the security subsystem 230 is complete, the second processor 210 may return (or give back) the authority of the access to the security subsystem 230. For example, the second processor 210 may transmit a request signal related to return of the authority of the access to the authority assignment device 220.

When the second processor 210 determines that the occupancy time of the security subsystem 230 exceeds a designated reference time, the second processor 210 may return (or give back) the authority of the access to the security subsystem 230. For example, when the second processor 210 is assigned the authority of the access to the security subsystem 230 from the authority assignment device 220, the second processor 210 may run a timer configured to run for the designated reference time. When the timer expires, the second processor 210 may return (or give back) the authority of the access to the security subsystem 230 regardless of whether the at least one job is completed. For example, the timer may include a timer instruction executed by the second processor 210, a timer program, and/or a timer configured in hardware included in the second processor 210. For example, when the at least one job is not completed based on the designated reference time, the second processor 210 may transmit a request signal related to authority of access to the security subsystem 230 to the authority assignment device 220. When assigned the authority of the access to the security subsystem 230 from the authority assignment device 220, the second processor 210 may preferentially perform the security function related to the at least one job that has not previously been completed through the security subsystem 230. For example, the designated reference time may include maximum time for the second processor 210 to process processing data. In one example, the maximum time to process data may be predicted based on the size (or maximum size) of data processed by the second processor 210, and may thus be predicted based on the size of data processed by the second processor 210.

The authority assignment device 220 may manage authority to access the security subsystem 230. According to an embodiment, the authority assignment device 220 may assign authority to access the security subsystem 230 to the first processor 200 or the second processor 210. According to an embodiment, the authority assignment device 220 may be separated from the first processor 200 and the second processor 210 physically or in hardware. According to an embodiment, the authority assignment device 220 may include memory (not shown). For example, the memory of the authority assignment device 220 may include a random access memory (RAM).

When a first authority assignment method (e.g., a semaphore method) is used, the authority assignment device 220 may alternately assign authority to access the security subsystem 230 to the first processor 200 or the second processor 210. For example, when continuously receiving a plurality of request signals for authority to access to the security subsystem 230 from the first processor 200 and receiving a request signal for authority to access to the security subsystem 230 from the second processor 210, the authority assignment device 220 may determine the plurality of request signals received from the first processor 200 as a single request signal. The authority assignment device 220 may assign authority to access the security subsystem 230 to the first processor 200, based on the request signals from the first processor 200. When the first processor 200 returns the authority to access the security subsystem 230, the authority assignment device 220 may assign authority to access the security subsystem 230 to the second processor 210. For example, information related to a request signal for authority to access the security subsystem 230 received by the authority assignment device 220 may be stored in the memory of the authority assignment device 220.

The authority assignment device 220 may assign authority to access the security subsystem 230 to the first processor 200 or the second processor 210, based on time (order) in which authority to access the security subsystem 230 is requested by the first processor 200 and/or the second processor 210. For example, when a second authority assignment method (e.g., a queue method) is used and priorities are not configured for the processors 200 and/or 210, the authority assignment device 220 may assign authority to access the security subsystem 230 to the first processor 200 or the second processor 210, based on time (order) in which authority to access the security subsystem 230 is requested. In one example, authority to access the security subsystem 230 may be preferentially assigned to a processor 200 or 210 that requests authority to access the security subsystem 230 at a relatively earlier time.

The authority assignment device 220 may preferentially assign authority to access the security subsystem 230 to the first processor 200 or the second processor 210, based on the priorities of the first processor 200 and the second processor 210. For example, the authority assignment device 220 may store a request signal for authority to access the security subsystem 230 in a buffer. For example, when the second assignment method (e.g., the queue method) is used and an authority assignment priority is configured for the first processor 200, the authority assignment device 220 may preferentially assign authority to access the security subsystem 230 to the first processor 200, based on at least one request signal received from the first processor 200 among request signals stored in the buffer. When processing the at least one request signal received from the first processor 200 among the request signals stored in the buffer, the authority assignment device 220 may assign authority to access the security subsystem 230 to the second processor 210, based on at least one request signal received from the second processor 210. For example, when the second assignment method (e.g., the queue method) is used and an authority assignment priority is configured for the second processor 210, the authority assignment device 220 may preferentially assign the authority to access the security subsystem 230 to the second processor 210, based on the at least one request signal received from the second processor 210 among the request signals stored in the buffer. When processing the at least one request signal received from the second processor 210 among the request signals stored in the buffer, the authority assignment device 220 may assign authority to access the security subsystem 230 to the first processor 200, based on at least one request signal received from the first processor 200.

The authority assignment device 220 may provide the security subsystem 230 with information related to a processor assigned authority to access the security subsystem 230. For example, when assigning authority to access the security subsystem 230 to the first processor 200, the authority assignment device 220 may provide the security subsystem 230 with information related to the first processor 200 assigned the authority to access the security subsystem 230. For example, when assigning authority to access the security subsystem 230 to the second processor 210, the authority assignment device 220 may provide the security subsystem 230 with information related to the second processor 210 assigned the authority to access the security subsystem 230. In one example, the information related to the processor assigned the authority to access the security subsystem 230 may include a key of the processor (e.g., the first processor 200 or the second processor 210) assigned the authority to access the security subsystem 230 and/or instruction information related to key selection of the processor assigned the authority to access the security subsystem 230.

When receiving a request signal related to return of authority to access the security subsystem 230 from the first processor 200 or the second processor 210, the authority assignment device 220 may withdraw the authority of the first processor 200 or the second processor 210 to access the security subsystem 230. For example, when receiving the request signal related to return of the authority to access the security subsystem 230 from the first processor 200 or the second processor 210, the authority assignment device 220 may control the security subsystem 230 to delete data related to the processor assigned the authority to access the security subsystem 230. For example, when receiving the request signal related to return of the authority to access the security subsystem 230 from the first processor 200 or the second processor 210, the authority assignment device 220 may provide an initialization request signal to the security subsystem 230. In one example, when determining that the data related to the processor assigned the authority to access the security subsystem 230 is completely deleted from the security subsystem 230, the authority assignment device 220 may determine that the authority to access the security subsystem 230 is withdrawn. In one example, deletion of the data related to the processor assigned the authority to access the security subsystem 230 may be identified (or monitored) based on a finite state machine (FSM, not shown) of the authority assignment device 220. In one example, the FSM of the authority assignment device 220 may include an FSM included in the authority assignment device 220. In one example, the FSM of the authority assignment device 220 may be configured to a first state (e.g., a lock state) when the data related to the processor assigned the authority is processed and/or stored through the security subsystem 230. In one example, the FSM of the authority assignment device 220 may be configured to a second state (e.g., a free state) when the data related to the processor assigned the authority is deleted from the security subsystem 230. In one example, the processor assigned the authority to access the security subsystem 230 may include a processor having transmitted a request signal related to return of authority to access the security subsystem 230. In one example, the data related to the processor is data generated and/or processed by the processor using the security subsystem 230, and may include data related to at least one of encrypted data, an encrypted operation value, decrypted data, a decrypted operation value, a signature, an authentication certificate, or an encryption key.

The authority assignment device 220 may include a plurality of FSMs. For example, the plurality of FSMs may include a first FSM indicating whether the data related to the processor assigned the authority to access the security subsystem 230 is stored, a second FSM indicating the type of the processor assigned the authority to access the security subsystem 230, and a third FSM indicating at least one request related to the authority to access the security subsystem 230. For example, the type and/or number of FSMs included in the authority assignment device 220 are not limited to the above example.

The security subsystem 230 may perform a security function related to the first processor 200 or the second processor 210. The security subsystem 230 may perform at least one security function, such as authentication related to a job processed by the first processor 200 or the second processor 210 to which the authority assignment device 220 assigns the authority to access the security subsystem 230, generation of an authentication certificate of data related to the job, a check for the authentication certificate of the data related to the job, generation of a signature on the data related to the job, a check for the signature on the data related to the job, encryption of the data related to the job, decryption of the data related to the job, or generation of an encryption key related to the job. The security subsystem 230 may provide the result of processing the security function to the first processor 200 or the second processor 210. The security subsystem 230 may be separated from the first processor 200 and the second processor 210 physically or in hardware.

According to an embodiment of the disclosure, the security subsystem 230 may include a memory (not shown). In one example, the memory of the security subsystem 230 may include an RAM. In one example, the memory of the security subsystem 230 may store data related to a processor processed by the security subsystem 230. In one example, the data related to the processor is data generated and/or processed by the processor 200 and/or 210 using the security subsystem 230, and may include data related to at least one of encrypted data, an encrypted operation value, decrypted data, a decrypted operation value, a signature, an authentication certificate, or an encryption key.

When receiving an initialization request signal from the authority assignment device 220, the security subsystem 230 may delete the data related to the processor assigned the authority to access the security subsystem 230. For example, the security subsystem 230 may delete information related to the previous processor 200 or 210 (e.g., information related to a processor key) existing in an internal memory (e.g., a static RAM (SRAM)) of the security subsystem 230 and/or a register path.

Referring to FIG. 2B, the security subsystem 230 may include a bus 231, a key generation module 232, a processor key management module 233, a key management module 234, and/or an encryption module 235. For example, the bus 231 may include a circuit for exchanging information (e.g., a control method and/or data) between components (e.g., the key generation module 232, the processor key management module 233, the key management module 234, and/or the encryption module 235) included in the security subsystem 230. For example, the key generation module 232 may generate a random key to perform a security function of the security subsystem 230. In one example, the key generation module 232 may include a true random number generator (TRNG). For example, the processor key management module 233 may manage a key of the first processor 200 and a key of the second processor 210 that enable access to the security subsystem 230. For example, the key management module 234 may generate a security key for performing a security function, based on the random key generated by the key generation module 232 and the key of the processor assigned the authority to access the security subsystem 230 provided from the processor key management module 233. For example, the encryption module 235 may encrypt or decrypt data received from the processor assigned the authority to access the security subsystem 230, based on the security key generated by the key management module 234. In one example, the encryption module 235 may perform at least one of a crypto operation, a hash operation, or a key derivation function (KDF) operation based on the security key generated by the key management module 234.

The processor key management module 233 may include a processor key selection module 241, a first processor key management module 242, and a second processor key management module 243. For example, the first processor key management module 242 may include a circuit configured to store and manage the key of the first processor 200. For example, the second processor key management module 243 may include a circuit configured to store and manage the key of the second processor 210. In one example, the first processor key management module 242 and the second processor key management module 243 may be separated physically or in hardware. For example, the first processor key management module 242 and the second processor key management module 243 may be included in one package. In one example, the first processor key management module 242 and/or the second processor key management module 243 may include a memory (e.g., a read-only memory (ROM)) configured to store the key of the first processor 200 and/or the key of the second processor 210. In one example, the first processor key management module 242 and/or the second processor key management module 243 may be configured as a memory (e.g., a ROM) configured to store the key of the first processor 200 and/or the key of the second processor 210. In one example, the key of the first processor 200 is a root key of the first processor 200, and may include a one-time programmable (OTP) or an eFuse related to the first processor 200. In one example, the key of the first processor 200 may include a derived key based on the root key of the first processor 200. In one example, the key of the second processor 210 is a root key of the second processor 210, and may include an OTP or eFuse related to the second processor 210. In one example, the key of the second processor 210 may include a derived key based on the root key of the second processor 210. In one example, the root key of the processor 200 and/or 210 is a unique value of the processor configured in the production process of the electronic device 101, and may include a fixed value.

The processor key selection module 241 may select the key of the processor 200 or 210 assigned the authority to access the security subsystem 230 by the authority assignment device 220, and may provide the key to the key management module 234 (or the security subsystem 230). In one example, when the authority to access the security subsystem 230 is assigned to the first processor 200 by the authority assignment device 220, the processor key selection module 241 may provide the key of the first processor 200 to the key management module 234 (or security subsystem 230). In one example, when the authority to access the security subsystem 230 is assigned to the second processor 210 by the authority assignment device 220, the processor key selection module 241 may provide the key of the second processor 210 to the key management module 234 (or security subsystem 230). In one example, the processor key selection module 241 may identify the processor 200 or 210 assigned the authority to access the security subsystem 230, based on the information related to the processor assigned the authority to access the security subsystem 230 received from the authority assignment device 220. In one example, the processor key selection module 241 may include a multiplexer.

Figure 3:
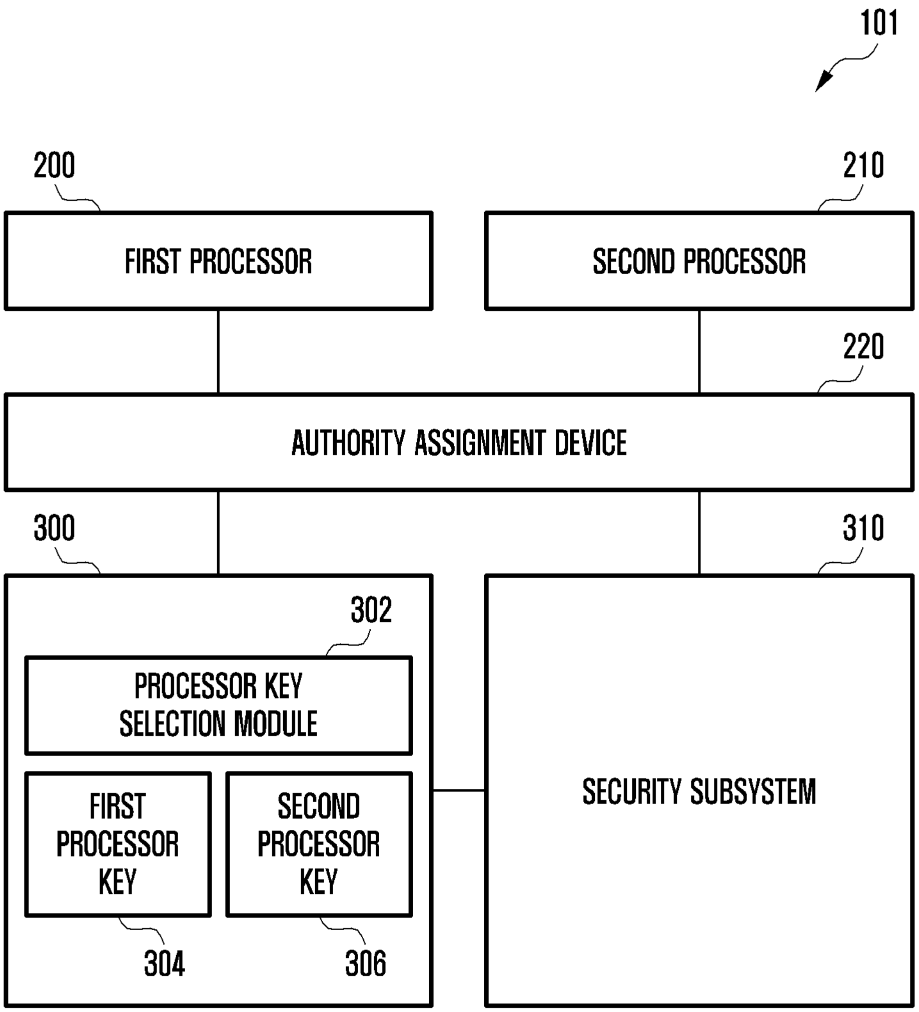
FIG. 3 is a block diagram of an electronic device for providing a security function according to an embodiment of the disclosure.

FIG. 3 is a block diagram of an electronic device 101 for providing a security function according to an embodiment of the disclosure.

Referring to FIG. 3, in the following description, the electronic device 101 may include a security subsystem 310 as a security device for executing a security function. However, the security device is not limited to the security subsystem 310, and may include other devices for executing the security function of the electronic device 101.

Referring to FIG. 3, the electronic device 101 may include a first processor 200, a second processor 210, an authority assignment device 220, a processor key management device 300, and/or the security subsystem 310 (e.g., security subsystem 230 of FIGS. 2A and 2B). The first processor 200 may be substantially the same as the processor 120 or the main processor 121 of FIG. 1, or may include the processor 120 or the main processor 121. The second processor 210 may be substantially the same as the processor 120 or the coprocessor 123 (e.g., the communication processor) of FIG. 1, or may include the processor 120 or the coprocessor 123. The first processor 200 and/or the second processor 210 may be operatively, functionally, and/or electrically connected to the authority assignment device 220, the processor key management device 300, and/or the security subsystem 310. The first processor 200 and the second processor 210 may be separated physically or in hardware. The first processor 200, the second processor 210, the authority assignment device 220, the processor key management device 300, and/or the security subsystem 310 may be included in one package. The first processor 200, the second processor 210, the authority assignment device 220, the processor key management device 300, and/or the security subsystem 310 may be included in a plurality of packages (e.g., processor packages). Since the processor 200, the second processor 210, and the authority assignment device 220 of FIG. 3 operate the same as the processor 200, the second processor 210, and the authority assignment device 220 of FIG. 2A, a detailed description of the processor 200, the second processor 210, and the authority assignment device 220 of FIG. 3 is omitted.

The processor key management device 300 may manage a key of the first processor 200 and a key of the second processor 210 that enable access to the security subsystem 310. The processor key management device 300 may include a processor key selection module 302, a first processor key management module 304, and a second processor key management module 306. For example, the first processor key management module 304 may include a circuit configured to store and manage the key of the first processor 200. For example, the second processor key management module 306 may include a circuit configured to store and manage the key of the second processor 210. In one example, the first processor key management module 304 and the second processor key management module 306 may be separated physically or in hardware. For example, the first processor key management module 304 and the second processor key management module 306 may be included in one package. In one example, the first processor key management module 304 and/or the second processor key management module 306 may include a memory (e.g., a ROM) configured to store the key of the first processor 200 and/or the key of the second processor 210. In one example, the first processor key management module 304 and/or the second processor key management module 306 may be configured as a memory (e.g., a ROM) configured to store the key of the first processor 200 and/or the key of the second processor 210. In one example, the key of the first processor 200 is a root key of the first processor 200, and may include a one-time programmable (OTP) or an eFuse related to the first processor 200. In one example, the key of the first processor 200 may include a derived key based on the root key of the first processor 200. In one example, the key of the second processor 210 is a root key of the second processor 210, and may include an OTP or eFuse related to the second processor 210. In one example, the key of the second processor 210 may include a derived key based on the root key of the second processor 210. In one example, the root key of the processor 200 and/or 210 is a unique value of the processor configured in the production process of the electronic device 101, and may include a fixed value.

The processor key selection module 302 may select the key of the processor 200 or 210 assigned authority to access the security subsystem 310 by the authority assignment device 220, and may provide the key to the security subsystem 310. In one example, when the authority to access the security subsystem 310 is assigned to the first processor 200 by the authority assignment device 220, the processor key selection module 302 may provide the key of the first processor 200 to the security subsystem 310. In one example, when the authority to access the security subsystem 310 is assigned to the second processor 210 by the authority assignment device 220, the processor key selection module 302 may provide the key of the second processor 210 to the security subsystem 310. In one example, the processor key selection module 302 may identify the processor 200 or 210 assigned the authority to access the security subsystem 310, based on information related to the processor assigned the authority to access the security subsystem 310 received from the authority assignment device 220. In one example, the processor key selection module 302 may include a multiplexer.

The security subsystem 310 may perform a security function related to the first processor 200 or the second processor 210. The security subsystem 310 may perform at least one of security functions, such as authentication related to a job processed by the first processor 200 or the second processor 210 to which the authority assignment device 220 assigns the authority to access the security subsystem 310, generation of a signature on data related to the job, a check for the signature on the data related to the job, generation of an authentication certificate of the data related to the job, a check for the authentication certificate of the data related to the job, encryption of the data related to the job, decryption of the data related to the job, or generation of an encryption key related to the job. The security subsystem 310 may provide the result of processing the security function to the first processor 200 or the second processor 210. The security subsystem 310 may be separated from the first processor 200 and the second processor 210 physically or in hardware. According to an embodiment of the disclosure, the security subsystem 310 may include a memory (not shown). In one example, the memory of the security subsystem 310 may include an RAM. In one example, the memory of the security subsystem 310 may store data related to a processor processed by the security subsystem 310. In one example, the data related to the processor is data generated and/or processed by the processor 200 and/or 210 using the security subsystem 310, and may include data related to at least one of encrypted data, an encrypted operation value, decrypted data, a decrypted operation value, a signature, an authentication certificate, or an encryption key.

When receiving an initialization request signal from the authority assignment device 220, the security subsystem 310 may delete the data related to the processor assigned the authority to access the security subsystem 310. For example, the security subsystem 310 may delete information related to the previous processor 200 or 210 (e.g., information related to a processor key) existing in an internal memory (e.g., a static RAM (SRAM)) of the security subsystem 310 and/or a register path.

The authority assignment device 220 may control the security subsystem 230 or 310 to delete the data related to the processor previously assigned the authority in order to withdraw the authority to access the security subsystem 230 or 310, thereby isolating the first processor 200 and the second processor 210 and thus strengthening the security of the electronic device 101.

According to various embodiments of the disclosure, an electronic device (e.g., the electronic device 101 of FIG. 1, 2A, or 3) may include an application processor (e.g., the main processor 121 of FIG. 1 or the first processor 200 of FIG. 2A or 3), a communication processor (e.g., the coprocessor 123 of FIG. 1 or the second processor 210 of FIG. 2A or 3), a security subsystem (e.g., the security subsystem 230 or 310 of FIG. 2A or 3) configured to process a security function related to the application processor or the communication processor, an authority assignment device (e.g., the authority assignment device 220 of FIG. 2A or 3) configured to assign authority to access the security subsystem to the application processor or the communication processor, and a processor key management device (e.g., the processor key management module 233 of FIG. 2B or the processor key management device 300 of FIG. 3) configured to provide the security subsystem with a first key related to the application processor or a second key related to the communication processor, based on the application processor or the communication processor assigned the authority to access the security subsystem from the authority assignment device, wherein the security subsystem may process a security function related to the application processor or the communication processor by using the first key or the second key provided from the processor key management device, based on the authority assignment device assigning the authority to access the security subsystem to the application processor or the communication processor, and may initialize data related to the application processor or the communication processor, based on returning the authority to access the security subsystem assigned to the application processor or the communication processor.

According to various embodiments, the authority assignment device may alternately assign the authority to access the security subsystem to the application processor or the communication processor when receiving a plurality of request signals related to the authority to access the security subsystem from the application processor and the communication processor.

According to various embodiments, the authority assignment device may assign the authority to access the security subsystem to the application processor, based on time of receiving at least one request signal related to the authority to access the security subsystem when receiving the at least one request signal from the communication processor after consecutively receiving a plurality of request signals related to the authority to access the security subsystem from the application processor, and may assign the authority to access the security subsystem to the communication processor when withdrawing the authority to access the security subsystem from the application processor.

According to various embodiments, the authority assignment device may assign the authority to access the security subsystem to the application processor or the communication processor, based on time of receiving an access request when receiving a request signal related to the authority to access the security subsystem from the application processor and/or the communication processor.

According to various embodiments, the authority assignment device may identify a processor for which priority in the authority to access the security subsystem is configured when receiving a plurality of request signals related to the authority to access the security subsystem from the application processor and the communication processor, may assign the authority to access the security subsystem to the application processor when the priority is configured for the application processor, and may assign the authority to access the security subsystem to the communication processor when determining that at least one job corresponding to a request signal related to the authority to access the security subsystem received from the application processor is completely processed.

According to various embodiments, the authority assignment device may identify a processor for which priority in the authority to access the security subsystem is configured when receiving a plurality of request signals related to the authority to access the security subsystem from the application processor and the communication processor, may assign the authority to access the security subsystem to the communication processor when the priority is configured for the communication processor, and may assign the authority to access the security subsystem to the application processor when determining that at least one job corresponding to a request signal related to the authority to access the security subsystem received from the communication processor is completely processed.

According to various embodiments, the communication processor may return the authority to access the security subsystem regardless of completely processing the security function related to the communication processor when a designated reference time expires based on time when the authority to access the security subsystem is assigned from the authority assignment device.

According to various embodiments, the communication processor may identify whether there is a security function not completely processed based on the designated reference time with the authority to access the security subsystem previously assigned when assigned the authority to access the security subsystem from the authority assignment device, and may process the security function not completely processed through the security subsystem when there is the security function not completely processed.

According to various embodiments, the security subsystem may delete the first key and data related to the security function of the application processor when receiving information related to return of the authority to access the security subsystem assigned to the application processor from the authority assignment device, and may delete the second key and data related to the security function of the communication processor when receiving information related to return of the authority to access the security subsystem assigned to the communication processor from the authority assignment device.

According to various embodiments, the authority assignment device may provide the security subsystem with information related to the assignment of the authority to access the security subsystem to the application processor when assigning the authority to the application processor, and may provide the security subsystem with information related to the assignment of the authority to access the security subsystem to the communication processor when assigning the authority to the communication processor.

According to various embodiments, the communication processor may return the authority to access the security subsystem when completely processing the security function related to the communication processor before the designated reference time expires.

According to various embodiments, the authority assignment device may provide the processor key management device with information related to assignment of the authority to access the security subsystem to the application processor when assigning the authority to the application processor, and the processor key management device may transmit the first key related to the application processor to the security subsystem, based on the information related to the assignment of the authority to the application processor.

According to various embodiments, the authority assignment device may provide the processor key management device with information related to assignment of the authority to access the security subsystem to the communication processor when assigning the authority to the communication processor, and the processor key management device may transmit the second key related to the communication processor to the security subsystem, based on the information related to the assignment of the authority to the communication processor.

Figure 4A:
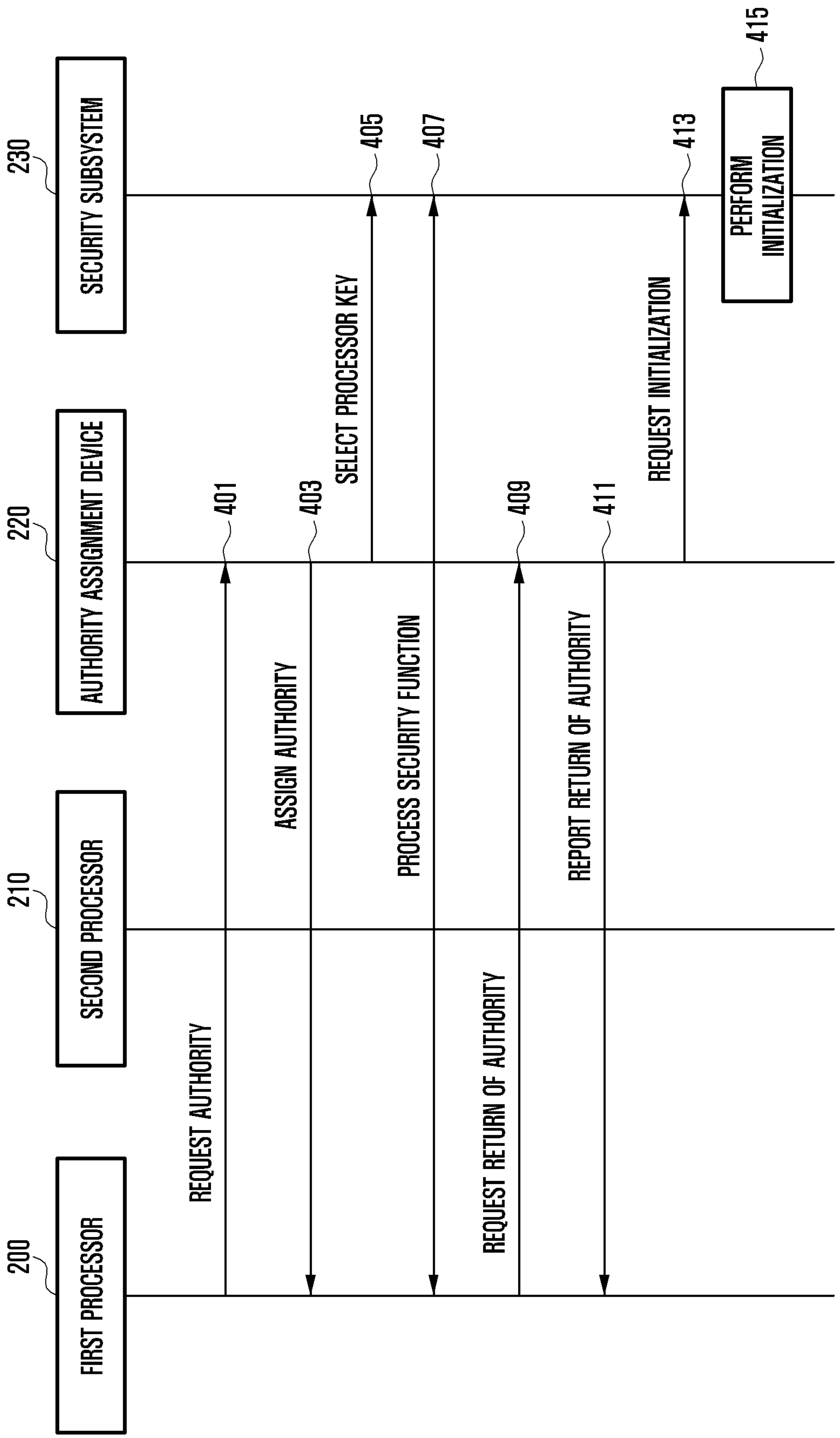
FIG. 4A illustrates an example in which an electronic device assigns authority to access a security device to a first processor according to an embodiment of the disclosure.

FIG. 4A illustrates an example in which an electronic device assigns authority to access a security device (e.g., the security subsystem 230) to a first processor according to an embodiment of the disclosure.

Referring to FIG. 4A, when there is at least one job related to a security function, the first processor 200 of the electronic device 101 may transmit a request signal related to authority to access the security subsystem 230 to an authority assignment device 220 in operation 401. For example, the request signal related to the authority may include information (e.g., identification information) related to the first processor 200 requesting the authority and/or a first value (e.g., "1") indicating a request for the authority.

The authority assignment device 220 may assign authority to access the security subsystem 230 to the first processor 200, based on the request signal related to the authority to access the security subsystem 230 received from the first processor 200. The authority assignment device 220 may transmit a signal (e.g., an acknowledgment (ACK) signal) related to assignment of the authority to access to the security subsystem 230 to the first processor 200 in operation 403. For example, the signal related to the assignment of the authority may include information (e.g., identification information) related to a processor (e.g., the first processor 200) to which the authority is assigned. When there is no processor assigned authority to access the security subsystem 230, the authority assignment device 220 may assign the authority to access the security subsystem 230 to the first processor 200. When there is a processor assigned authority to access the security subsystem 230, the authority assignment device 220 may identify whether the authority to access the security subsystem 230 is withdrawn. When the authority to access the security subsystem 230 is withdrawn, the authority assignment device 220 may assign the authority to access the security subsystem 230 to the first processor 200. For example, when receiving a plurality of request signals for authority to access the security subsystem 230, the authority assignment device 220 may assign the authority to access the security subsystem 230 to the first processor 200, based on at least one of an authority assignment method, time of requesting access authority, and the priority of access authority.

When the authority to access the security subsystem 230 is assigned to the first processor 200, the authority assignment device 220 may transmit information related to the assignment of the authority to the first processor 200 (e.g., instruction information related to key selection of the first processor 200) to the security subsystem 230 in operation 405. The security subsystem 230 may obtain a key of the first processor 200, based on the information related to the assignment of the authority to the first processor 200 (e.g., the instruction information related to key selection of the first processor 200) received from the authority assignment device 220. For example, the key of the first processor 200 may be obtained from the first processor key management module 242 through the processor key selection module 241 included in the processor key management module 233 of FIG. 2B.

When assigned the authority to access the security subsystem 230 from the authority assignment device 220, the first processor 200 may perform the security function through the security subsystem 230 in operation 407. According to an embodiment, the security subsystem 230 may process the security function of the first processor 200, based on the key of the first processor 200. For example, the security function may include at least one of functions of encrypting a file system related to the first processor 200, encrypting a random access memory (RAM) related to the first processor 200, generating an encrypted signature on critical data (e.g., payment data) related to the first processor 200, checking the signature, or generating an encryption key.

When completing the at least one job related to the security function, the first processor 200 may request return (or giving-back) of the authority to access the security subsystem 230 in operation 409. When completing the at least one job related to the security function, the first processor 200 may transmit a request signal related to return of the authority to access the security subsystem 230 to the authority assignment device 220. For example, the request signal related to the return of the authority may include the information (e.g., the identification information) related to the processor 200 returning the authority and/or a second value (e.g., "0") indicating return of the authority, which is different from the first value.

The authority assignment device 220 may withdraw the authority of the first processor 200 to access the security subsystem 230, based on a request for the return (or giving-back) of the authority to access the security subsystem 230 from the first processor 200. The authority assignment device 220 may transmit information (e.g., authority return notification information or report return of authority) related to the return (or giving-back) of the authority to access the security subsystem 230 to the first processor 200 in operation 411.

The authority assignment device 220 may control the security subsystem 230 to delete data related to the first processor 200, based on the return of the authority of the first processor 200 to access the security subsystem 230 in operation 413. When withdrawing the authority to access the security subsystem 230 from the first processor 200, the authority assignment device 220 may provide an initialization request signal to the security subsystem 230 in operation 413.

The security subsystem 230 may initialize the security subsystem 230, based on the initialization request signal received from the authority assignment device 220 in operation 415. The security subsystem 230 may delete the information related to the first processor 200 existing in an internal memory of the security subsystem 230 and/or a register path through initialization of the security subsystem 230. For example, the information related to the first processor 200 may include the key of the first processor 200 and/or operation information based on the key of the first processor 200.

The authority assignment device 220 may withdraw the authority of the first processor 200 to access the security subsystem 230 regardless of the request for the return (or giving-back) of the authority to access the security subsystem 230 from the first processor 200. When determining that time for which the first processor 200 occupies the security subsystem 230 exceeds a designated reference time, the authority assignment device 220 may withdraw the authority of the first processor 200 to access the security subsystem 230. The authority assignment device 220 may transmit the information (e.g., authority return notification information) related to the return (or giving-back) of the authority to access the security subsystem 230 to the first processor 200, based on withdrawal of the authority of the first processor 200 to access the security subsystem 230 in operation 411. For example, operation 409 of FIG. 4A may be omitted.

Figure 4B:
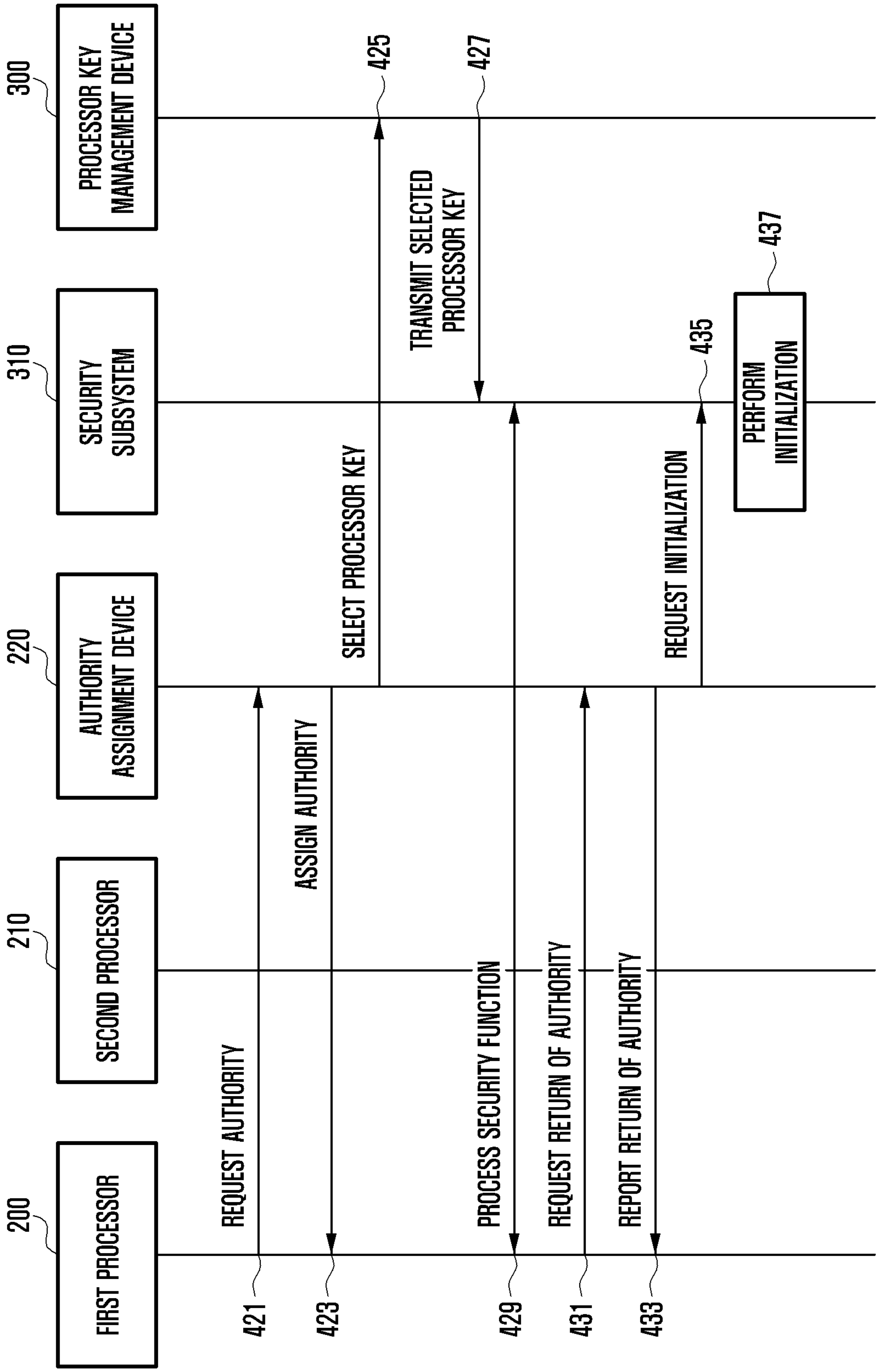
FIG. 4B illustrates an example in which an electronic device assigns authority to access a security device to a first processor according to an embodiment of the disclosure.

FIG. 4B illustrates an example in which an electronic device assigns authority to access a security device (e.g., the security subsystem 310) to a first processor according to an embodiment of the disclosure.

Referring to FIG. 4B, when there is at least one job related to a security function, the first processor 200 of the electronic device 101 may transmit a request signal related to authority to access the security subsystem 310 to an authority assignment device 220 in operation 421.

The authority assignment device 220 may assign authority to access the security subsystem 310 to the first processor 200, based on the request signal related to the authority to access the security subsystem 310 received from the first processor 200. The authority assignment device 220 may transmit a signal (e.g., an ACK signal) related to assignment of the authority to access to the security subsystem 310 to the first processor 200 in operation 423. For example, the signal related to the assignment of the authority may include information (e.g., identification information) related to a processor (e.g., the first processor 200) to which the authority is assigned. For example, operation 421 and operation 423 of FIG. 4B may include operations corresponding to (or the same as) operation 401 and operation 403 of FIG. 4A.

When the authority to access the security subsystem 310 is assigned to the first processor 200, the authority assignment device 220 may transmit information related to the assignment of the authority to the first processor 200 (e.g., instruction information related to key selection of the first processor 200) to a processor key management device 300 in operation 425.

The processor key management device 300 may select a key of the first processor 200, based on the information related to the assignment of the authority to the first processor 200 (e.g., the instruction information related to key selection of the first processor 200) received from the authority assignment device 220. The processor key management device 300 may provide information related to the key of the first processor 200 (or the key of the first processor 200) to the security subsystem 310 in operation 427. For example, the key of the first processor 200 may be obtained from the first processor key management module 304 through the processor key selection module 302 of FIG. 3.

When assigned the authority to access the security subsystem 310 from the authority assignment device 220, the first processor 200 may perform the security function through the security subsystem 310 in operation 429. According to an embodiment, the security subsystem 310 may process the security function of the first processor 200, based on the key of the first processor 200 obtained from the processor key management device 300. For example, the security function may include at least one of functions of encrypting a file system related to the first processor 200, encrypting a RAM related to the first processor 200, generating an encrypted signature on critical data (e.g., payment data) related to the first processor 200, checking the signature, or generating an encryption key.

When completing the at least one job related to the security function, the first processor 200 may request return (or giving-back) of the authority to access the security subsystem 310 in operation 431. According to an embodiment, when completing the at least one job related to the security function, the first processor 200 may transmit a request signal related to return of the authority to access the security subsystem 310 to the authority assignment device 220.

The authority assignment device 220 may withdraw the authority of the first processor 200 to access the security subsystem 310, based on a request for the return of the authority to access the security subsystem 310 from the first processor 200. The authority assignment device 220 may transmit information (e.g., authority return notification information or report return of authority) related to the return of the authority to access the security subsystem 310 to the first processor 200 in operation 433.

The authority assignment device 220 may control the security subsystem 310 to delete data related to the first processor 200, based on the return of the authority of the first processor 200 to access the security subsystem 310 in operation 435. When receiving the request signal related to the return of the authority to access the security subsystem 310 from the first processor 200, the authority assignment device 220 may provide an initialization request signal to the security subsystem 310 in operation 435.

The security subsystem 310 may initialize the security subsystem 310, based on the initialization request signal received from the authority assignment device 220 in operation 437. According to an embodiment, the security subsystem 310 may delete the information related to the first processor 200 existing in an internal memory of the security subsystem 310 and/or a register path through initialization of the security subsystem 310.

The authority assignment device 220 may withdraw the authority of the first processor 200 to access the security subsystem 230 regardless of the request for the return (or giving-back) of the authority to access the security subsystem 230 from the first processor 200. When determining that time for which the first processor 200 occupies the security subsystem 230 exceeds a designated reference time, the authority assignment device 220 may withdraw the authority of the first processor 200 to access the security subsystem 230. The authority assignment device 220 may transmit the information (e.g., authority return notification information) related to the return (or giving-back) of the authority to access the security subsystem 230 to the first processor 200, based on withdrawal of the authority of the first processor 200 to access the security subsystem 230 in operation 433. For example, operation 431 of FIG. 4B may be omitted.

Figure 5:
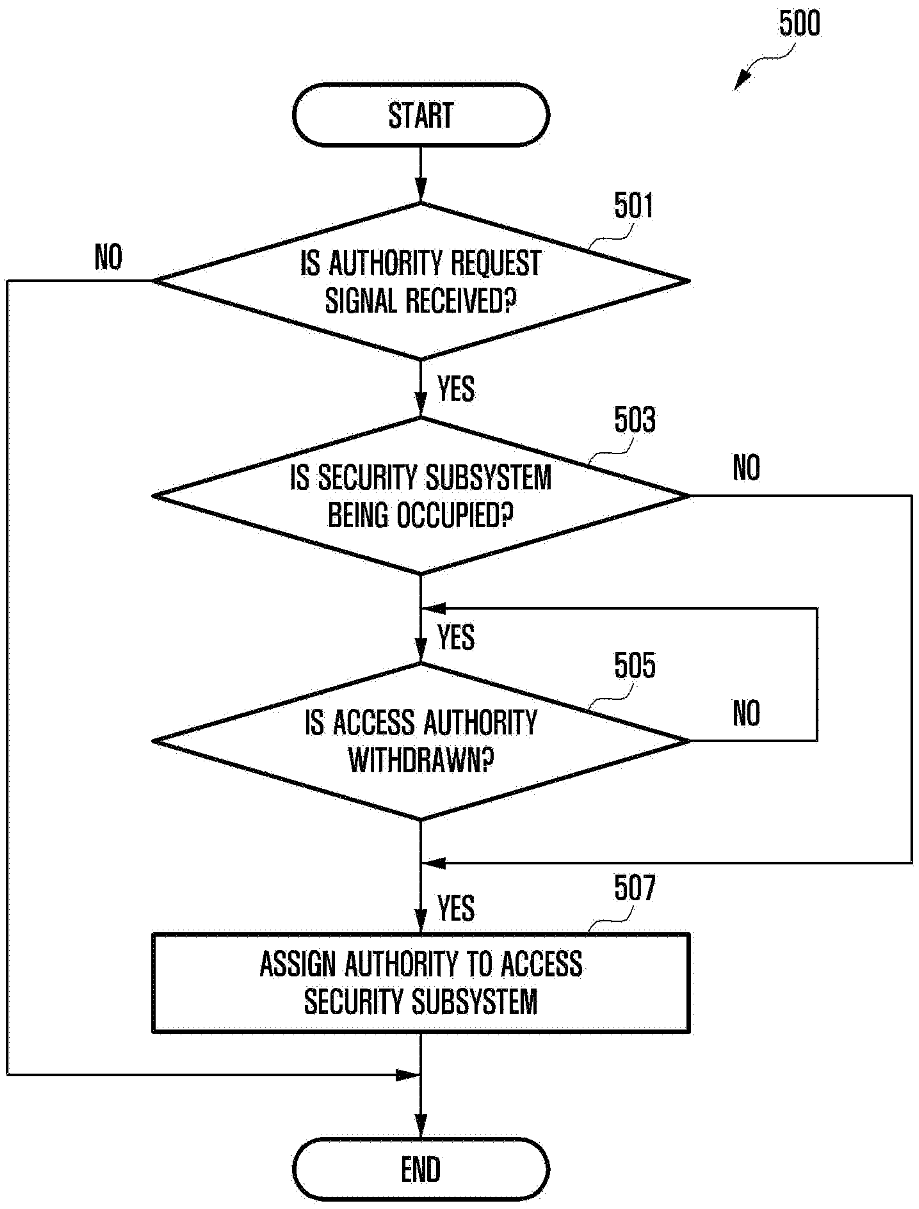
FIG. 5 is a flowchart illustrating that an electronic device assigns authority to access a security device according to an embodiment of the disclosure.

FIG. 5 is a flowchart 500 illustrating that an electronic device assigns authority to access a security device (e.g., the security subsystem 230 or 310) according to an embodiment of the disclosure.

Referring to FIG. 5, in the following embodiments, operations may be sequentially performed, but are not necessarily performed sequentially. For example, the operations may be performed in a different order, or at least two operations may be performed in parallel. For example, the electronic device of FIG. 5 may be the electronic device 101 of FIG. 1 or 2.

Referring to FIG. 5, in operation 501, the electronic device (e.g., the authority assignment device 220 of FIG. 2) may identify whether a request signal related to authority to access the security subsystem 230 or 310 is received from the first processor 200 and/or the second processor 210. In one example, the request signal related to the authority may include information (e.g., identification information) related to a processor (e.g., the first processor 200 or the second processor 210) requesting the authority and/or a first value (e.g., "1") indicating a request for the authority.

When the request signal related to the authority to access the security subsystem 230 or 310 is not received (e.g., "No" in operation 501), the electronic device (e.g., the authority assignment device 220) may terminate an embodiment of assigning authority to access the security subsystem 230 or 310.

When the request signal related to the authority to access the security subsystem 230 or 310 is received (e.g., "Yes" in operation 501), the electronic device (e.g., the authority assignment device 220) may identify whether the first processor 200 or the second processor 210 is occupying (or using) the security subsystem 230 or 310 in operation 503. When there is a processor (e.g., the first processor 200 or the second processor 210) assigned authority to access the security subsystem 230 or 310, the authority assignment device 220 may determine that the security subsystem 230 or 310 is being occupied.

When determining that the security subsystem 230 or 310 is not being occupied (e.g., "No" in operation 503), the electronic device (e.g., the authority assignment device 220) may assign authority to access the security subsystem 230 to the processor (the first processor 200 or the second processor 210) having transmitted the request signal related to the authority to access the security subsystem 230 or 310 in operation 507.

When determining that the security subsystem 230 or 310 is being occupied (e.g., "Yes" in operation 503), the electronic device (e.g., the authority assignment device 220) may identify whether the authority to access the security subsystem 230 or 310 is withdrawn (or return) in operation 505. When receiving a request signal related to return of the authority to access the security subsystem 230 or 310 from the processor (e.g., the first processor 200 or the second processor 210) assigned the authority, the authority assignment device 220 may control the security subsystem 230 or 310 to delete data related to the processor assigned the authority to access the security subsystem 230 or 310. When determining that the data related to the processor assigned the authority to access the security subsystem 230 or 310 has been completely deleted from the security subsystem 230 or 310, the authority assignment device 220 may determine that the authority to access the security subsystem 230 or 310 has been withdrawn. In one example, the request signal related to the return of the authority may include information (e.g., identification information) related to the processor (e.g., the first processor 200 or the second processor 210) returning the authority and/or a second value (e.g., "0") indicating return of the authority, which is different from the first value.

When determining that the authority to access the security subsystem 230 or 310 has not been withdrawn (e.g., "No" in operation 505), the electronic device (e.g., the authority assignment device 220) may identify whether the authority to access the security subsystem 230 or 310 is withdrawn in operation 505. According to an embodiment, the authority assignment device 220 may identify whether a request signal related to return of the authority to access the security subsystem 230 or 310 is received.

When determining that the authority to access the security subsystem 230 or 310 has been withdrawn (e.g., "Yes" in operation 505), the electronic device (e.g., the authority assignment device 220) may assign authority to access the security subsystem 230 or 310 to the processor (e.g., the first processor 200 or the second processor 210) having transmitted the request signal related to the authority to access the security subsystem 230 or 310 in operation 507. When receiving a plurality of request signals for authority to access the security subsystem 230 or 310, the authority assignment device 220 may assign authority to access the security subsystem 230 or 310 to the processor (e.g., the first processor 200 or the second processor 210) having transmitted the request signal related to the authority to access the security subsystem 230 or 310, based on at least one of an authority assignment method, time of requesting access authority, and the priority of access authority.

The security subsystem 230 or 310 may obtain a key of the processor (e.g., the first processor 200 or the second processor 210) assigned the authority to access the security subsystem 230 or 310, based on control of the authority assignment device 220. The security subsystem 230 may obtain a key of the first processor 200 or a key of the second processor 210 from the first processor key management module 242 or the second processor key management module 243 through the key selection module 241 of FIG. 2B. The security subsystem 310 may obtain the key (e.g., the key of the first processor 200 or the key of the second processor 210) of the processor (e.g., the first processor 200 or the second processor 210) assigned the authority to access the security subsystem 310 from the processor key management device 300 of FIG. 3.

Figure 6:
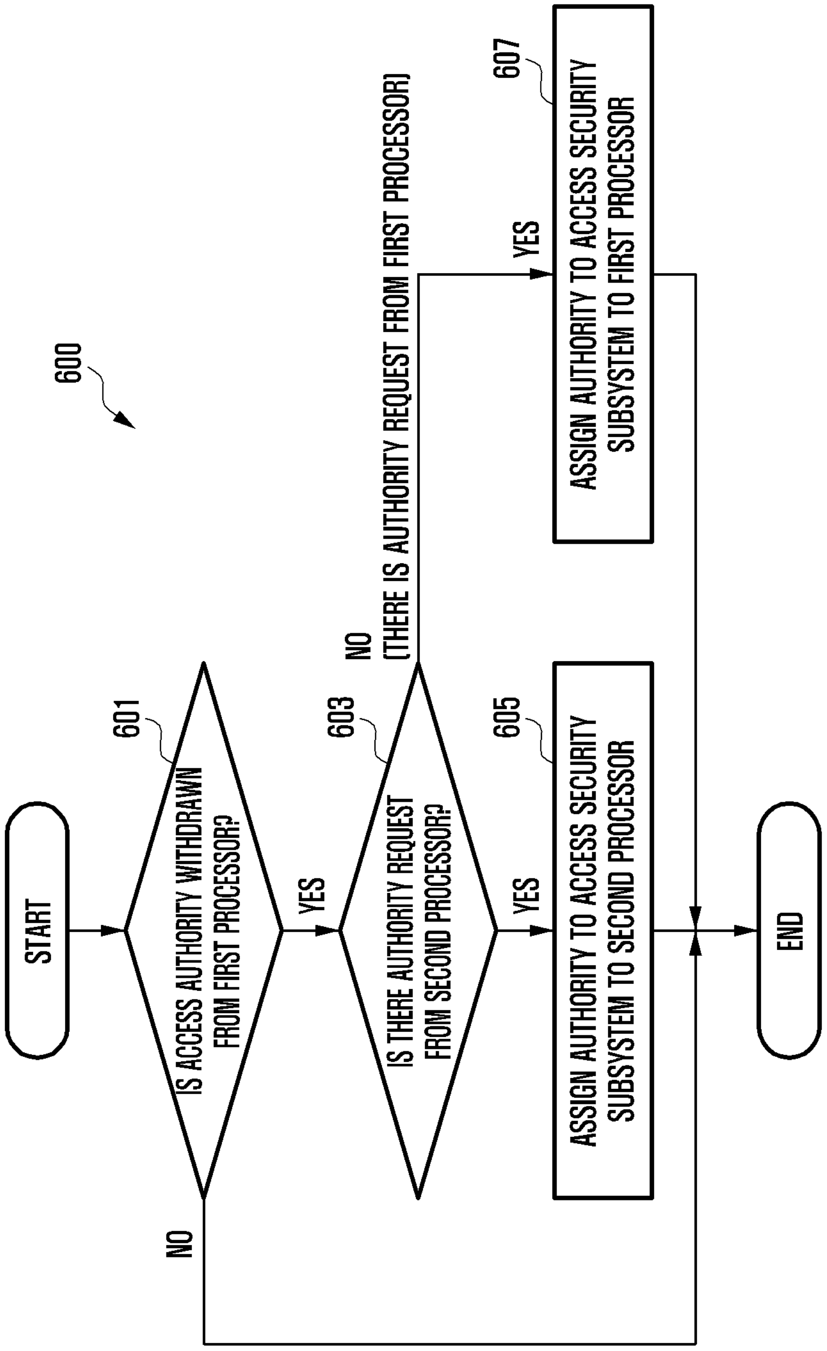
FIG. 6 is a flowchart illustrating that an electronic device assigns authority to access a security device, based on a first authority assignment method, according to an embodiment of the disclosure.

FIG. 6 is a flowchart 600 illustrating that an electronic device assigns authority to access a security device (e.g., the security subsystem 230 or 310), based on a first authority assignment method, according to an embodiment of the disclosure.

Referring to FIG. 6, the illustrated operations may be detailed operations of operation 505 and operation 507 of FIG. 5. Operations may be sequentially performed, but are not necessarily performed sequentially. For example, the operations may be performed in a different order, or at least two operations may be performed in parallel. For example, the electronic device of FIG. 6 may be the electronic device 101 of FIG. 1 or 2. At least some components of FIG. 6 may be described below with reference to FIG. 7.

Figure 7:
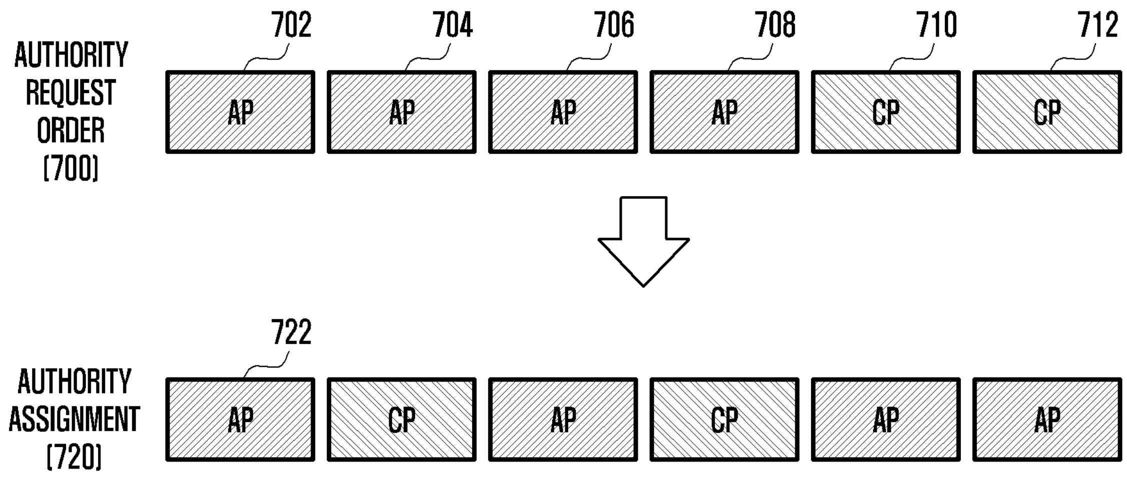
FIG. 7 illustrates an example in which an electronic device assigns authority to access a security device, based on a first authority assignment method, according to an embodiment of the disclosure.

FIG. 7 illustrates an example in which an electronic device assigns authority to access a security device, based on a first authority assignment method, according to an embodiment of the disclosure.

Referring to FIGS. 6 and 7, in operation 601, the electronic device (e.g., the authority assignment device 220 of FIG. 2) may identify whether authority to access the security subsystem 230 or 310 is withdrawn from the first processor 200. As illustrated in FIG. 7, when there is a plurality of jobs related to a security function, the first processor 200 may transmit request signals 702, 704, 706, and 708 related to authority to access the security subsystem 230 or 310 corresponding to the respective jobs to the authority assignment device 220. When determining that the security subsystem 230 or 310 is not occupied, the authority assignment device 220 may assign authority 720 to access the security subsystem 230 or 310 to the first processor 200, based on at least some (e.g., a request signal 702 corresponding to a first job) of the plurality of request signals 702, 704, 706, and 708 received from the first processor 200 (e.g., an application processor (AP)) (722). The first processor 200 may perform a security function related to the first job through the security subsystem 230 or 310, based on the authority assigned by the authority assignment device 220. When determining that the security function related to the first job is completely performed, the first processor 200 may transmit a request signal related to return of the authority to access the security subsystem 230 or 310 to the authority assignment device 220. For example, when receiving the request signal related to the return of the authority to access the security subsystem 230 or 310 from the first processor 200, the authority assignment device 220 may transmit a request signal for deletion of data related to the first processor 200 to the security subsystem 230 or 310. The security subsystem 230 or 310 may delete the data related to the first processor 200, based on the request signal for the deletion of the data related to the first processor 200. When determining that the data related to the first processor 200 is completely deleted from the security subsystem 230 or 310, the authority assignment device 220 may determine that the authority to access the security subsystem 230 or 310 is withdrawn from the first processor 200. In one example, the authority assignment device may identify whether the data related to the first processor 200 is completely deleted from the security subsystem 230 or 310 through a finite state machine (FSM). For example, when not receiving the request signal related to the return of the authority to access to the security subsystem 230 or 310 from the first processor 200, the authority assignment device 220 may determine that the authority to access the security subsystem 230 or 310 is not withdrawn from the first processor 200.

When the authority to access to the security subsystem 230 or 310 is not withdrawn from the first processor 200 (e.g., "No" in operation 601), the electronic device (e.g., the authority assignment device 220) may terminate an embodiment of assigning authority to access the security subsystem 230 or 310.

When the authority to access to the security subsystem 230 or 310 is withdrawn from the first processor 200 (e.g., "Yes" in operation 601), the electronic device (e.g., the authority assignment device 220) may identify whether there is an authority request from the second processor 210 (e.g., a communication processor (CP)) in operation 603. In one example, a request signal related to access authority may include information (e.g., identification information) related to the first processor 200 requesting the access authority and/or a first value (e.g., "1") indicating a request for the access authority.

When assigning the authority to access the security subsystem 230 or 310 to the first processor 200 (722), the authority assignment device 220 may store a designated number of request signals 704, 706, 708, 710, and/or 712 related to authority to access the security subsystem 230 or 310 received from the first processor 200 and/or the second processor 210. For example, information related to the request signals 704, 706, 708, 710, and/or 712 related to the authority to access the security subsystem 230 or 310 may be stored in the memory (not shown) of the authority assignment device 220. The information related to the request signals 704, 706, 708, 710, and/or 712 related to the authority to access the security subsystem 230 or 310 may be stored in the memory (not shown) of the first processor 200 and/or in the memory (not shown) of the second processor 210. The authority assignment device 220 may identify the request signals 704, 706, 708, 710, and/or 712 related to the authority to access the security subsystem 230 or 310 received from the first processor 200 and/or the second processor 210 through the finite state machine (e.g., the third FSM) of the authority assignment device 220 in a state in which the authority to access the security subsystem 230 or 310 is assigned to the first processor 200. For example, the memory of the first processor 200 may include a memory included in a processor package including the first processor 200. For example, the memory of the second processor 210 may include a memory included in a processor package including the second processor 210. For example, the memory of the first processor 200 and the memory of the second processor 200 may include a memory included in one processor package including the first processor 200 and the second processor 210.

The authority assignment device 220 may identify whether there is a request signal (e.g., a request signal 710 corresponding to a fifth job) received from the second processor 210, which is different from the first processor 200, among the stored request signals 704, 706, 708, 710, and/or 712 while the authority to access the security subsystem 230 or 310 is assigned to the first processor 200. In one example, the designated number is the maximum number of request signals related to authority to access the security subsystem 230 or 310 that the authority assignment device 220 is able to store, and may be configured based on the size of a memory (or buffer or queue) related to the authority assignment device 220.

When there is an authority request from the second processor 210 (e.g., "Yes" in operation 603), the electronic device (e.g., the authority assignment device 220) may assign authority to access the security subsystem 230 or 310 to the second processor 210 in operation 605. When using the first authority assignment method (e.g., a semaphore method), the authority assignment device 220 may determine the plurality of request signals 702, 704, 706, and 708 consecutively received from one processor (e.g., the first processor 200) as a single request signal. When assigning the authority to access the security subsystem 230 or 310 to the first processor 200 at a previous time, based on the plurality of request signals 702, 704, 706, and 708 received from the first processor 200, the authority assignment device 220 may assign the authority to access the security subsystem 230 or 310 to the second processor 210, based on the request signal 710 and/or 712 from the second processor 210. For example, the authority assignment device 220 may assign the authority to access the security subsystem 230 or 310 to the second processor 210 regardless of authorization request order 700. The second processor 210 may perform a security function related to the fifth job through the security subsystem 230 or 310, based on the authority assigned by the authority assignment device 220.

The security subsystem 230 or 310 may obtain a key of the second processor 210 assigned the authority to access the security subsystem 230 or 310, based on control of the authority assignment device 220. For example, the security subsystem 230 may obtain the key of the second processor 210 from the second processor key management module 243 through the key selection module 241 of FIG. 2B. For example, the security subsystem 310 may obtain the key of the second processor 210 from the processor key management device 300 of FIG. 3.

When there is no authority request from the second processor 210 and there is an authority request from the first processor 200 (e.g., "No" in operation 603), the electronic device (e.g., the authority assignment device 220) may assign authority to access the security subsystem 230 or 310 to the first processor 200 in operation 607. According to an embodiment, when receiving only a plurality of request signals 704, 706, and 708 from the first processor 200 while the authority to access the security subsystem 230 or 310 is assigned to the first processor 200, the authority assignment device 220 may assign authority to access the security subsystem 230 or 310 to the first processor 200, based on a request signal 704 corresponding to a second job of the first processor 200. The first processor 200 may perform a security function related to the second job through the security subsystem 230 or 310, based on the authority assigned by the authority assignment device 220.

The security subsystem 230 or 310 may obtain a key of the first processor 200 assigned the authority to access the security subsystem 230 or 310, based on control of the authority assignment device 220. For example, the security subsystem 230 may obtain the key of the first processor 200 from the first processor key management module 242 through the key selection module 241 of FIG. 2B. For example, the security subsystem 310 may obtain the key of the first processor 110 from the processor key management device 300 of FIG. 3.

When withdrawing the authority to access the security subsystem 230 or 310 from the second processor 210, the electronic device (e.g., the authority assignment device 220) may assign authority to access the security subsystem 230 or 310 to the first processor 200, based on the request signal 704 corresponding to the second job of the first processor 200. The first processor 200 may perform the security function related to the second job through the security subsystem 230 or 310, based on the authority assigned by the authority assignment device 220.

Figure 8:
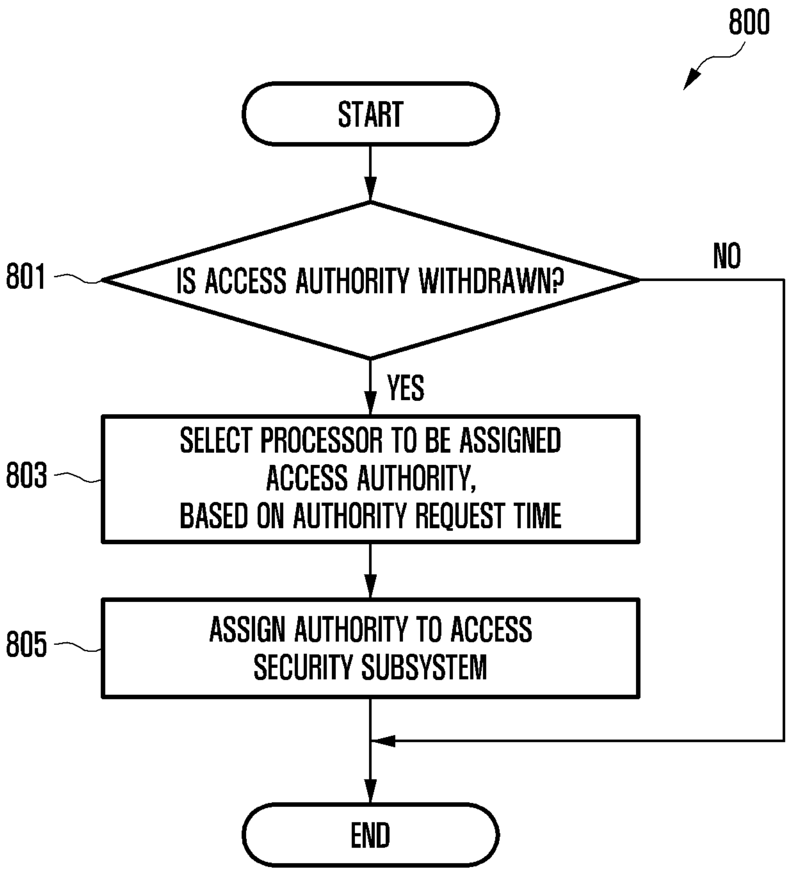
FIG. 8 is a flowchart illustrating that an electronic device assigns authority to access a security device, based on authority request time, according to an embodiment of the disclosure.

FIG. 8 is a flowchart 800 illustrating that an electronic device assigns authority to access a security device (e.g., the security subsystem 230 or 310), based on authority request time, according to an embodiment of the disclosure.

Referring to FIG. 8, the illustrated operations may be detailed operations of operation 505 and operation 507 of FIG. 5. In the following embodiments, operations may be sequentially performed, but are not necessarily performed sequentially. For example, the operations may be performed in a different order, or at least two operations may be performed in parallel. For example, the electronic device of FIG. 8 may be the electronic device 101 of FIG. 1 or 2. At least some components of FIG. 8 may be described below with reference to FIG. 9.

Figure 9:
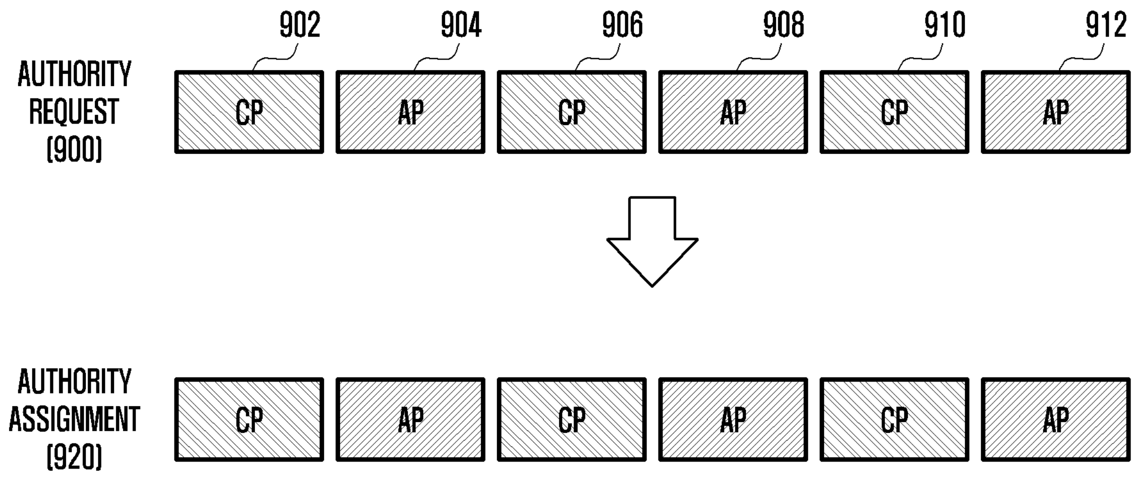
FIG. 9 illustrates an example in which an electronic device assigns authority to access a security device, based on authority request time, according to an embodiment of the disclosure.

FIG. 9 illustrates an example in which an electronic device assigns authority to access a security device, based on authority request time, according to an embodiment of the disclosure.

Referring to FIGS. 8 and 9, in operation 801, the electronic device (e.g., the authority assignment device 220 of FIG. 2) may identify whether authority to access the security subsystem 230 or 310 is withdrawn. When receiving a request signal 900 related to return of authority to access the security subsystem 230 or 310 from the first processor 200 or the second processor 210, the authority assignment device 220 may transmit a request signal for deletion of data related to a processor (e.g., the first processor 200 or the second processor 210) having transmitted the request signal related to the return of the authority to access the security subsystem 230 or 310 to the security subsystem 230 or 310. The security subsystem 230 or 310 may delete the data related to the first processor 200 or the second processor 210, based on the request signal for the deletion of the data related to the processor (e.g., the first processor 200 or the second processor 210) having transmitted the request signal related to the return of the authority to access the security subsystem 230 or 310. When determining that the data related to the first processor 200 or the second processor 210 is completely deleted from the security subsystem 230 or 310, the authority assignment device 220 may determine that the authority to access the security subsystem 230 or 310 is withdrawn. In one example, the authority assignment device may identify whether the data related to the first processor 200 or the second processor 210 is deleted from the security subsystem 230 or 310 through a finite state machine (FSM). When not receiving the request signal related to the return of the authority to access to the security subsystem 230 or 310 from the first processor 200 or the second processor 210, the authority assignment device 220 may determine that the authority to access the security subsystem 230 or 310 is not withdrawn.

When the authority to access to the security subsystem 230 or 310 is not withdrawn (e.g., "No" in operation 801), the electronic device (e.g., the authority assignment device 220) may terminate an embodiment of assigning authority to access the security subsystem 230 or 310.

When the authority to access to the security subsystem 230 or 310 is withdrawn (e.g., "Yes" in operation 801), the electronic device (e.g., the authority assignment device 220) may select a processor to be assigned authority 920 to access the security subsystem 230 or 310, based on the authority request time of the first processor 200 and/or the second processor 210 in operation 803. When assigning authority to access the security subsystem 230 or 310 to the first processor 200 (e.g., an AP) or the second processor 210 (e.g., the CP), the authority assignment device 220 may store a designated number of request signals 902, 904, 906, 908, 910, and/or 912 related to authority to access the security subsystem 230 or 310 received from the first processor 200 and/or the second processor 210. In one example, information related to the request signals 902, 904, 906, 908, 910, and/or 912 related to the authority to access the security subsystem 230 or 310 may be stored in the memory (not shown) of the authority assignment device 220. The authority assignment device 220 may select, as the processor to be assigned the authority to access the security subsystem 230 or 310, the second processor 210 having transmitted a request for access authority at the earliest time (e.g., 902) among the designated number of request signals 902, 904, 906, 908, 910, and/or 912 related to the authority to access the security subsystem 230 or 310 received from the first processor 200 and/the second processor 210.

In operation 805, the electronic device (e.g., the authority assignment device 220) may assign authority to access the security subsystem 230 or 310 to the selected processor to be assigned the authority to access the security subsystem 230 or 310. When a second authority assignment method (e.g., a queue method) is used and priorities are not configured for the first processor 200 and the second processor 210, the authority assignment device 220 may sequentially assign authority to access the security subsystem 230 or 310 to the first processor 200 or the second processor 210, based on time at which authority to access the security subsystem 230 is requested. For example, as illustrated in FIG. 9, when the second processor 210 has the earliest authority request time, the authority assignment device 220 may assign authority to access the security subsystem 230 or 310 to the second processor 210, based on a request signal 902 from the second processor 210. The second processor 210 may perform a security function related to a job corresponding to the request signal 902 through the security subsystem 230 or 310, based on the authority assigned by the authority assignment device 220.

The security subsystem 230 or 310 may obtain a key of the processor (e.g., the first processor 200 or the second processor 210) assigned the authority to access the security subsystem 230 or 310, based on control of the authority assignment device 220. According to an embodiment illustrated in FIG. 2B, the key of the processor (e.g., the first processor 200 or the second processor 210) assigned the authority to access the security subsystem 230 or 310 may be obtained from the first processor key management module 242 or the second processor key management module 243 included in the security subsystem 230. According to an embodiment illustrated in FIG. 3, the key of the processor (e.g., the first processor 200 or the second processor 210) assigned the authority to access the security subsystem 230 or 310 may be obtained from the processor key management device 300 separate from the security subsystem 310.

When withdrawing the authority to access the security subsystem 230 or 310 from the second processor 210, the electronic device (e.g., the authority assignment device 220) may assign authority to access the security subsystem 230 or 310 to the first processor 200, based on a request signal 904 from the first processor 200. The first processor 200 may perform a security function related to a job corresponding to the request signal 904 through the security subsystem 230 or 310, based on the authority assigned by the authority assignment device 220.

Figure 10:
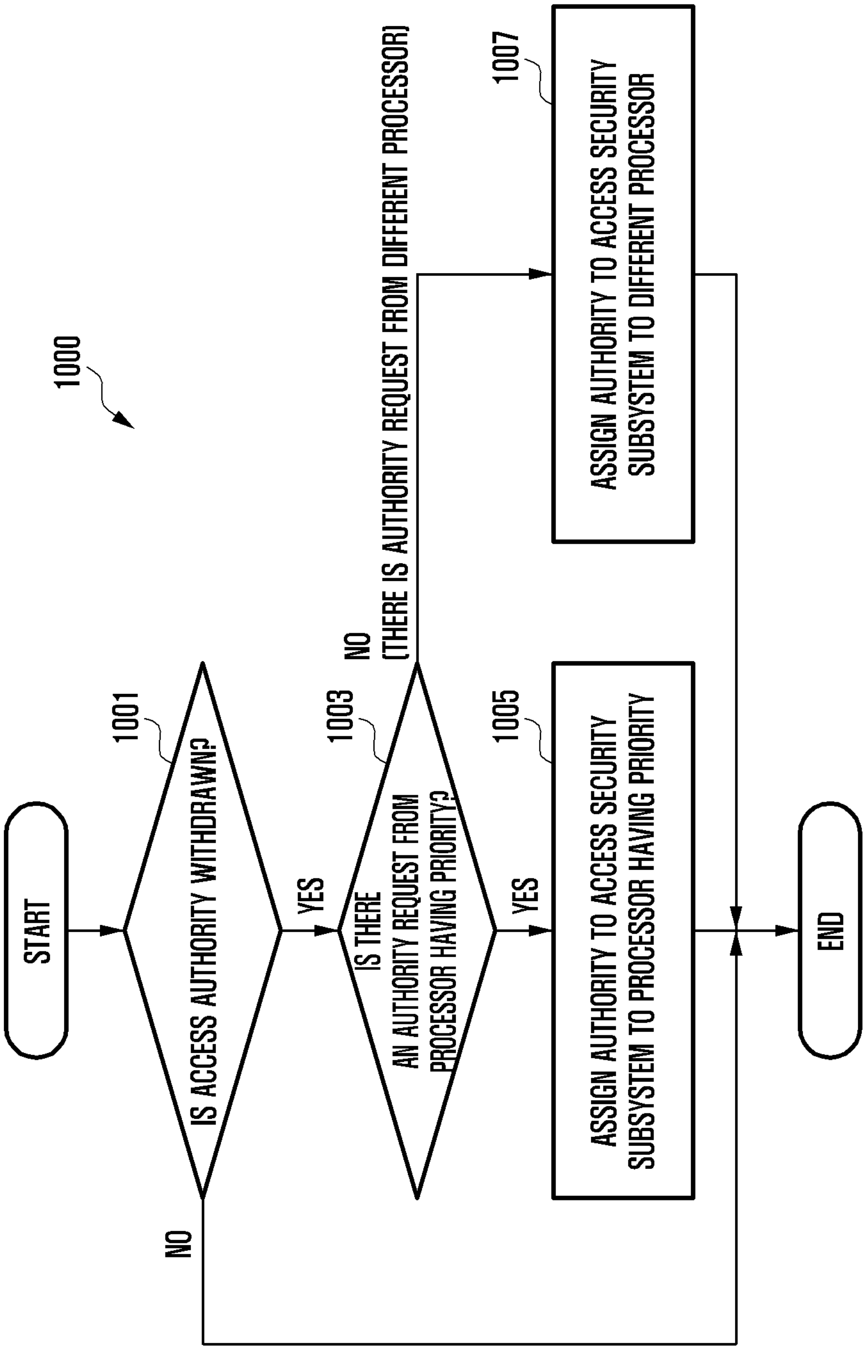
FIG. 10 is a flowchart illustrating that an electronic device assigns authority to access a security device, based on an authority assignment priority, according to an embodiment of the disclosure.

FIG. 10 is a flowchart 1000 illustrating that an electronic device assigns authority to access a security device (e.g., the security subsystem 230 or 310), based on an authority assignment priority, according to an embodiment of the disclosure.

Referring to FIG. 10, the illustrated operations may be detailed operations of operation 505 and operation 507 of FIG. 5. In the following embodiments, operations may be sequentially performed, but are not necessarily performed sequentially. For example, the operations may be performed in a different order, or at least two operations may be performed in parallel. For example, the electronic device of FIG. 10 may be the electronic device 101 of FIG. 1 or 2. At least some components of FIG. 10 may be described below with reference to FIGS. 11 and 12.

Figure 11:
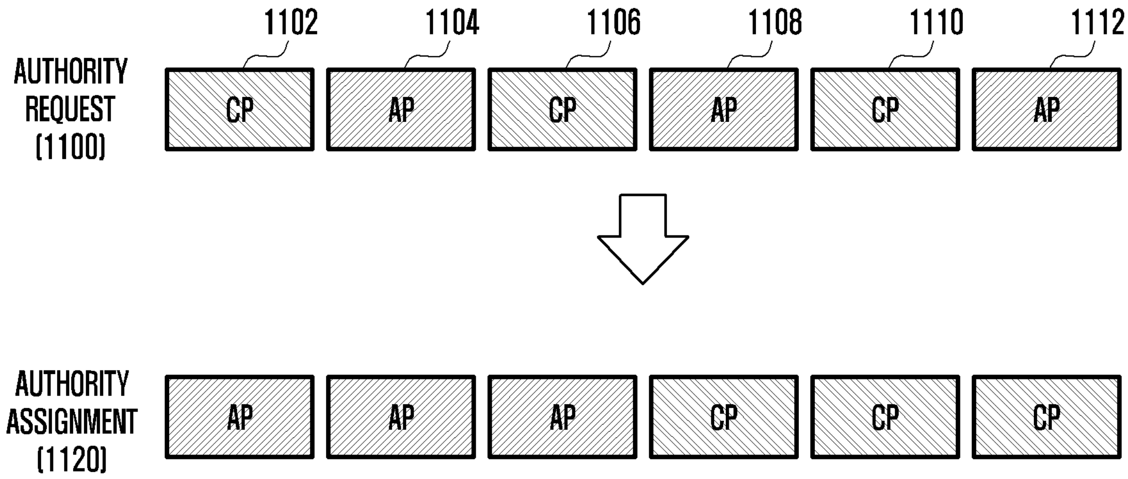
FIG. 11 illustrates an example in which an electronic device assigns authority to access a security device, based on an authority assignment priority, according to an embodiment of the disclosure.

FIG. 11 illustrates an example in which an electronic device assigns authority to access a security device, based on an authority assignment priority, according to an embodiment of the disclosure.

Figure 12:
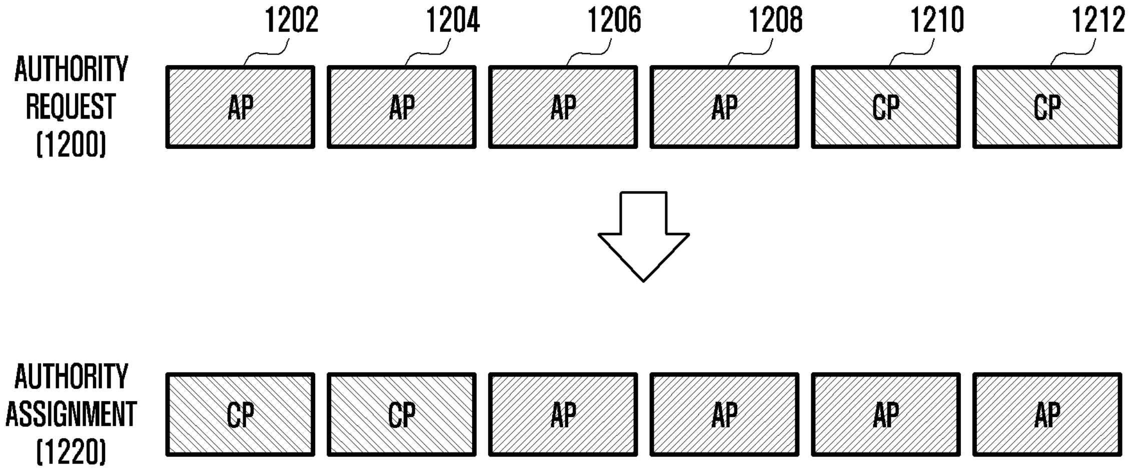
FIG. 12 illustrates another example in which an electronic device assigns authority to access a security device, based on an authority assignment priority, according to an embodiment of the disclosure.

FIG. 12 illustrates another example in which an electronic device assigns authority to access a security device, based on an authority assignment priority, according to an embodiment of the disclosure.

Referring to FIG. 10, FIG. 11, and/or FIG. 12, in operation 1001, the electronic device (e.g., the authority assignment device 220 of FIG. 2) may identify whether authority to access the security subsystem 230 or 310 is withdrawn. When receiving a request signal 1100 or 1200 related to return of authority to access the security subsystem 230 or 310 from the first processor 200 (e.g., an AP) and/or the second processor 210 (e.g., a CP), the authority assignment device 220 may transmit a request signal for deletion of data related to a processor having assigned the authority to access the security subsystem 230 or 310 to the security subsystem 230 or 310. The security subsystem 230 or 310 may delete the data related to the processor having assigned the authority to access the security subsystem 230 or 310, based on the request signal for the deletion of the data related to the processor, based on the request signal for the deletion of the data. When determining that the data related to the processor having assigned the authority to access the security subsystem 230 or 310 is completely deleted from the security subsystem 230 or 310, the authority assignment device 220 may determine that the authority to access the security subsystem 230 or 310 is withdrawn. In one example, the authority assignment device may identify whether the data related to the processor having assigned the authority to access the security subsystem 230 or 310 is deleted from the security subsystem 230 or 310 through a finite state machine (FSM). In one example, the processor having assigned the authority to access the security subsystem 230 or 310 may include a processor having transmitted the request signal related to the return of the authority to access the security subsystem 230 or 310.

When not receiving the request signal related to the return of the authority to access to the security subsystem 230 or 310 from the first processor 200 or the second processor 210, the authority assignment device 220 may determine that the authority to access the security subsystem 230 or 310 is not withdrawn.

When the authority to access to the security subsystem 230 or 310 is not withdrawn (e.g., "No" in operation 1001), the electronic device (e.g., the authority assignment device 220) may terminate an embodiment of assigning authority to access the security subsystem 230 or 310.

When the authority to access to the security subsystem 230 or 310 is withdrawn (e.g., "Yes" in operation 1001), the electronic device (e.g., the authority assignment device 220) may identify whether there is an authority request from a processor (e.g., the first processor 200 or the second processor 210) having priority in operation 1003. When assigning authority 1120 to access the security subsystem 230 or 310 to the first processor 200 or the second processor 210, the authority assignment device 220 may store a designated number of request signals 1102, 1104, 1106, 1108, 1110, and/or 1112 related to authority to access the security subsystem 230 or 310 received from the first processor 200 and/or the second processor 210. In one example, information related to the request signals 1102, 1104, 1106, 1108, 1110, and/or 1112 related to the authority to access the security subsystem 230 or 310 may be stored in the memory (not shown) of the authority assignment device 220. When priority in authority to access the security subsystem 230 or 310 is configured for the first processor 200, the authority assignment device 220 may identify whether there is a request signal (e.g., 1104, 1108, and/or 1112) related to authority to access the security subsystem 230 or 310 received from the first processor 200 among the designated number of request signals 1102, 1104, 1106, 1108, 1110, and/or 1112 related to the authority to access the security subsystem 230 or 310.

When assigning authority 1220 to access the security subsystem 230 or 310 to the first processor 200 or the second processor 210, the authority assignment device 220 may store a designated number of request signals 1202, 1204, 1206, 1208, 1210, and/or 1212 related to authority to access the security subsystem 230 or 310 received from the first processor 200 and/or the second processor 210. In one example, information related to the request signals 1202, 1204, 1206, 1208, 1210, and/or 1212 related to the authority to access the security subsystem 230 or 310 may be stored in the memory (not shown) of the authority assignment device 220. When priority in authority to access the security subsystem 230 or 310 is configured for the second processor 210, the authority assignment device 220 may identify whether there is a request signal (e.g., 1210 and/or 1212) related to authority to access the security subsystem 230 or 310 received from the second processor 210 among the designated number of request signals 1202, 1204, 1206, 1208, 1210, and/or 1212 related to the authority to access the security subsystem 230 or 310.

When there is the authority request from the processor (e.g., the first processor 200 or the second processor 210) having the priority (e.g., "Yes" in operation 1003), the electronic device (e.g., the authority assignment device 220) may assign authority to access the security subsystem 230 or 310 to the processor having the priority in operation 1005. According to an embodiment illustrated in FIG. 11, when a second authority assignment method (e.g., a queue method) is used and the priority is configured for the first processor 200, the authority assignment device 220 may assign authority to access the security subsystem 230 or 310 to the first processor 200, based on a request signal 1104 received first among the request signals 1104, 1108, and 1112 received from the first processor 200. The first processor 200 may perform a security function related to a job corresponding to the request signal 1104 through the security subsystem 230 or 310, based on the authority assigned by the authority assignment device 220.

According to an embodiment illustrated in FIG. 12, when the second authority assignment method (e.g., the queue method) is used and the priority is configured for the second processor 210, the authority assignment device 220 may assign authority to access the security subsystem 230 or 310 to the second processor 210, based on a request signal 1210 received first among the request signals 1210 and 1212 received from the second processor 210. The second processor 210 may perform a security function related to a job corresponding to the request signal 1210 through the security subsystem 230 or 310, based on the authority assigned by the authority assignment device 220.

The security subsystem 230 or 310 may obtain a key of the second processor 210 assigned the authority to access the security subsystem 230 or 310, based on control of the authority assignment device 220. For example, as illustrated in FIG. 2B, the key of the second processor 210 may be obtained from the second processor key management module 243 included in the security subsystem 230. For example, as illustrated in FIG. 3, the key of the second processor 210 may be obtained from the processor key management device 300 separate from the security subsystem 310.

When there is no authority request from the processor (e.g., the first processor 200 or the second processor 210) having the priority (e.g., "No" in operation 1003), the electronic device (e.g., the authority assignment device 220) may assign authority to access the security subsystem 230 or 310 to a different processor, based on an authority request from the different processor having no priority in operation 1007. According to an embodiment illustrated in FIG. 11, when the authority to access the security subsystem 230 or 310 is withdrawn from the first processor 200, the authority assignment device 220 may assign authority to access the security subsystem 230 or 310 to the first processor 200, based on a request signal 1108 from the first processor 200 having the priority. The first processor 200 may perform a security function related to a job corresponding to the request signal 1108 through the security subsystem 230 or 310, based on the authority assigned by the authority assignment device 220. For example, when there is an authority request from the first processor 200 having the priority, the authority assignment device 220 may repeatedly assign authority to access the security subsystem 230 or 310 to the first processor 200. For example, when there is no authority request from the first processor 200 having the priority, the authority assignment device 220 may assign authority to access the security subsystem 230 or 310 to the second processor 210, based on a request signal 1102 from the second processor 210 having no priority. The second processor 210 may perform a security function related to a job corresponding to the request signal 1102 through the security subsystem 230 or 310, based on the authority assigned by the authority assignment device 220.

According to an embodiment illustrated in FIG. 12, when the authority to access the security subsystem 230 or 310 is withdrawn from the second processor 210, the authority assignment device 220 may assign authority to access the security subsystem 230 or 310 to the second processor 210, based on a request signal 1212 from the second processor 210 having the priority. The second processor 210 may perform a security function related to a job corresponding to the request signal 1212 through the security subsystem 230 or 310, based on the authority assigned by the authority assignment device 220. When there is no authority request from the second processor 210 having the priority, the authority assignment device 220 may assign authority to access the security subsystem 230 or 310 to the first processor 200, based on a request signal 1202 from the first processor 200 having no priority. The first processor 200 may perform a security function related to a job corresponding to the request signal 1202 through the security subsystem 230 or 310, based on the authority assigned by the authority assignment device 220. The security subsystem 230 or 310 may obtain a key of the first processor 200 assigned the authority to access the security subsystem 230 or 310, based on control of the authority assignment device 220. For example, as illustrated in FIG. 2B, the key of the first processor 200 may be obtained from the first processor key management module 242 included in the security subsystem 230. For example, as illustrated in FIG. 3, the key of the first processor 200 may be obtained from the processor key management device 300 separate from the security subsystem 310.

Figure 13:
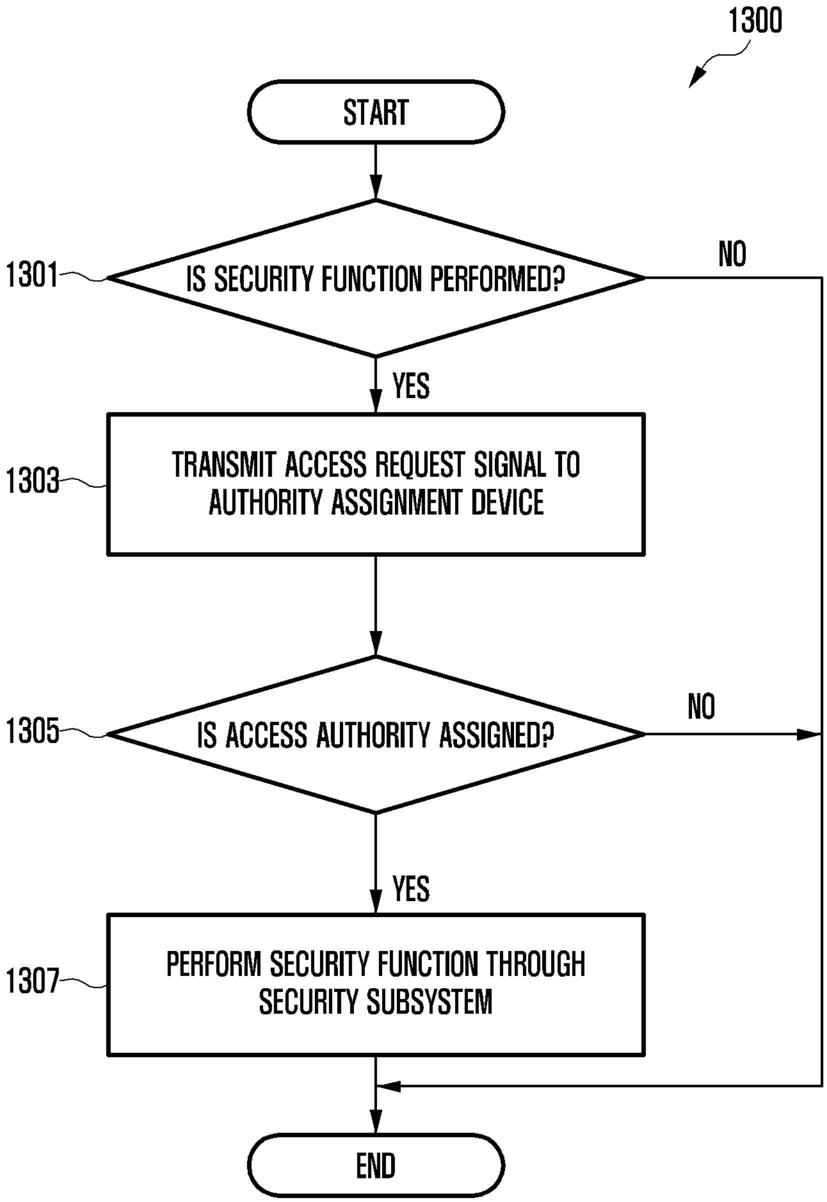
FIG. 13 is a flowchart illustrating that an electronic device requests authority to access a security device according to an embodiment of the disclosure.

FIG. 13 is a flowchart 1300 illustrating that an electronic device requests authority to access a security device (e.g., the security subsystem 230 or 310) according to an embodiment of the disclosure.

Referring to FIG. 13, operations may be sequentially performed, but are not necessarily performed sequentially. For example, the operations may be performed in a different order, or at least two operations may be performed in parallel. For example, the electronic device of FIG. 13 may be the electronic device 101 of FIG. 1 or 2.

Referring to FIG. 13, in operation 1301, the electronic device (e.g., the first processor 200 and/or the second processor 210 of FIG. 2) may determine whether to perform a security function using the security subsystem 230 or 310. When there is at least one job related to the security function, the first processor 200 and/or the second processor 210 may determine to perform the security function using the security subsystem 230 or 310. When there is a job not completed through the security subsystem 230 or 310, based on a designated reference time, the second processor 210 may determine to perform the security function using the security subsystem 230 or 310. When there is no at least one job related to the security function, the first processor 200 and/or the second processor 210 may determine not to perform the security function using the security subsystem 230 or 310.

When determining not to perform the security function using the security subsystem 230 or 310 (e.g., "No" in operation 1301), the electronic device (e.g., the first processor 200 and/or the second processor 210) may terminate an embodiment of requesting authority to access the security subsystem 230 or 310.

When determining to perform the security function using the security subsystem 230 or 310 (e.g., "Yes" in operation 1301), the electronic device (e.g., the first processor 200 and/or the second processor 210) may transmit a request signal related to authority to access the security subsystem 230 or 310 to the authority assignment device 220 in operation 1303. In one example, the request signal related to the authority may include information (e.g., identification information) related to a processor requesting the authority and/or a first value (e.g., "1") indicating a request for the authority.

In operation 1305, the electronic device (e.g., the first processor 200 and/or the second processor 210) may identify whether authority to access the security subsystem 230 or 310 is assigned from the authority assignment device 220. When receiving an ACK signal from the authority assignment device 220 in response to the request signal related to the authority to access of the security subsystem 230 or 310, the first processor 200 and/or the second processor 210 may determine that the authority to access the security subsystem 230 or 310 is assigned. When receiving no ACK signal from the authority assignment device 220 in response to the request signal related to the authority to access of the security subsystem 230 or 310, the first processor 200 and/or the second processor 210 may determine that the authority to access the security subsystem 230 or 310 is not assigned.

When determining that the authority to access the security subsystem 230 or 310 is not assigned from the authority assignment device 220 (e.g., "No" in operation 1305), the electronic device (e.g., the first processor 200 and/or the second processor 210) may terminate the embodiment of requesting the authority to access the security subsystem 230 or 310.

When determining that the authority to access the security subsystem 230 or 310 is assigned from the authority assignment device 220 (e.g., "Yes" in operation 1305), the electronic device (e.g., the first processor 200 and/or the second processor 210) may perform the security function related to the at least one job through the security subsystem 230 or 310 in operation 1307. According to an embodiment, the first processor 200 or the second processor 210 may perform, through the security subsystem 230 or 310, the security function related to the at least one job corresponding to the request signal transmitted to the authority assignment device 220 to be assigned the authority to access the security subsystem 230 or 310.

When completely performing the security function related to the at least one job through the security subsystem 230 or 310, the first processor 200 or the second processor 210 may transmit a request signal related to return of the authority to access the security subsystem 230 or 310 to the authority assignment device 220. In one example, the request signal related to the return of the authority may include the information (e.g., the identification information) related to the processor requesting the return of the authority and/or a second value (e.g., "0"), which is different from the first value indicating the request for the authority.

When the designated reference time from the time authority to access the security subsystem 230 or 310 is assigned expires, the second processor 210 may transmit a request signal related to return of the authority to access the security subsystem 230 or 310 to the authority assignment device 220.

Figure 14:
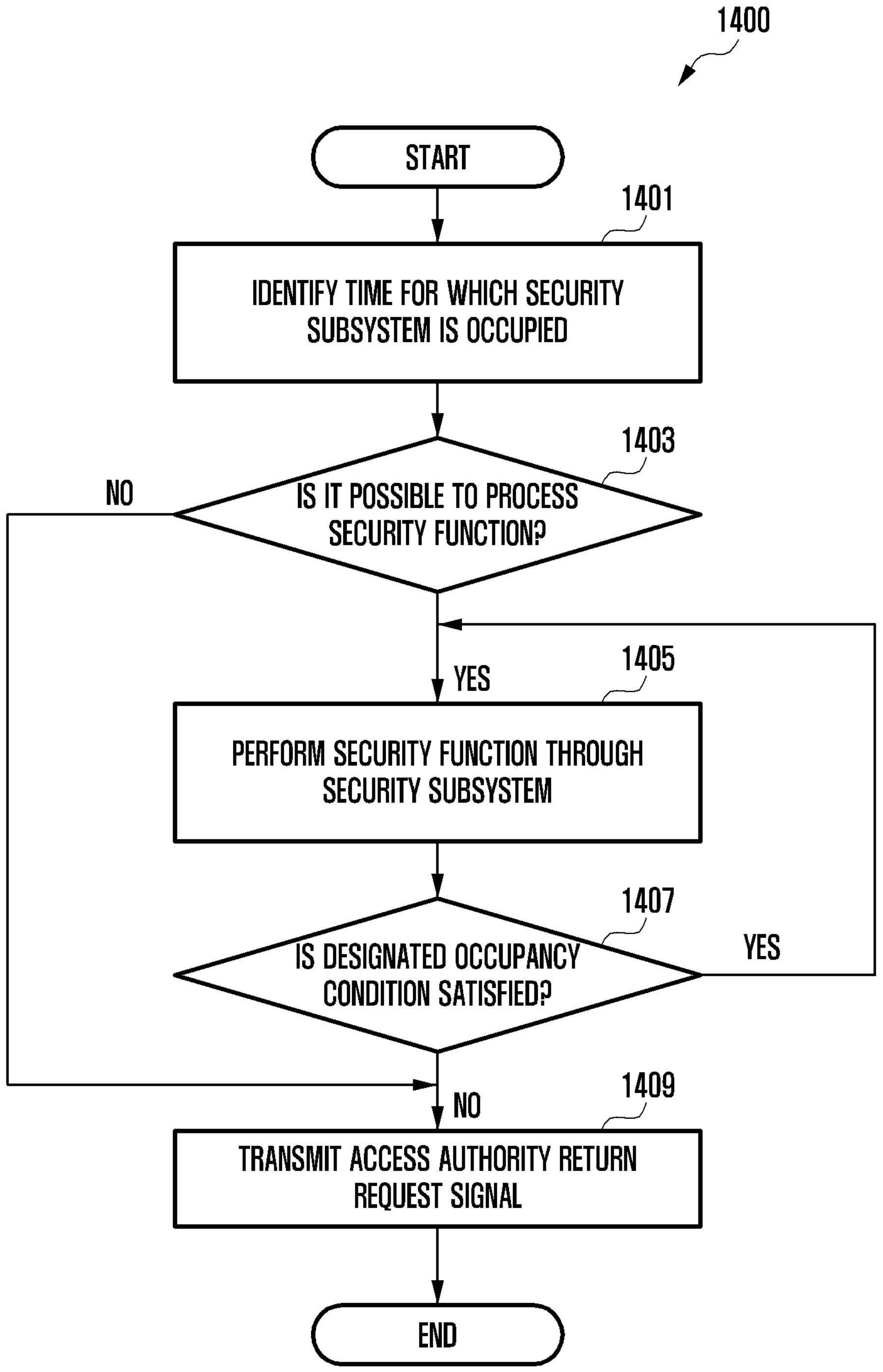
FIG. 14 is a flowchart illustrating that an electronic device returns authority to access a security device according to an embodiment of the disclosure.

FIG. 14 is a flowchart 1400 illustrating that an electronic device returns authority to access a security device (e.g., the security subsystem 230 or 310) according to an embodiment of the disclosure.

Referring to FIG. 14, the illustrated operations may be a detailed operation of operation 1307 of FIG. 13. In the following embodiments, operations may be sequentially performed, but are not necessarily performed sequentially. For example, the operations may be performed in a different order, or at least two operations may be performed in parallel. For example, the electronic device of FIG. 14 may be the electronic device 101 of FIG. 1 or 2.

Referring to FIG. 14, when authority to access the security subsystem 230 or 310 is assigned from the authority assignment device 220 (e.g., "Yes" in operation 1305 of FIG. 13), the electronic device (e.g., the second processor 210 of FIG. 2) may identify time for which the second processor 210 occupies the security subsystem 230 or 310 in operation 1401. When receiving a signal (e.g., an ACK signal) related to assignment of the authority to access the security subsystem 230 or 310 from the authority assignment device 220, the second processor 210 may run a timer. The second processor 210 may identify the time for which the second processor 210 occupies the security subsystem 230 or 310, based on the running time of the timer. For example, the timer may include a timer instruction executed by the second processor 210, a timer program, and/or a timer configured in hardware included in the second processor 210.

In operation 1403, the electronic device (e.g., the second processor 210) may identify whether it is possible to process a security function related to at least one job of the second processor 210, based on the time for which the second processor 210 occupies the security subsystem 230 or 310. The second processor 210 may occupy the security subsystem 230 or 310 for a designated reference time. The second processor 210 may detect time available for the second processor 210 to use the security subsystem 230 or 310, based on the time for which the second processor 210 occupies the security subsystem 230 or 310 and the designated reference time. The second processor 210 may identify whether it is possible to process the security function related to the at least one job of the second processor 210 for the time available for the second processor 210 to use the security subsystem 230 or 310.

When determining that it is impossible to process the security function related to the at least one job of the second processor 210 (e.g., "No" in operation 1403), the electronic device (e.g., the second processor 210) may transmit a request signal related to return of the authority to access the security subsystem 230 or 310 to the authority assignment device 220 in operation 1409. When the second processor 210 returns the authority to access the security subsystem 230 or 310, based on the time for which the second processor 210 occupies the security subsystem 230 or 310, the second processor 210 may transmit a request signal related to the authority to access the security subsystem 230 or 310 to the authority assignment device 220 to process the at least one job not processed.

When determining that it is possible to process the security function related to the at least one job of the second processor 210 (e.g., "Yes" in operation 1403), the electronic device (e.g., the second processor 210) may perform the security function related to the at least one job through the security subsystem 230 or 310 in operation 1405.

In operation 1407, the electronic device (e.g., the second processor 210) may identify whether a designated occupancy condition related to the security subsystem 230 or 310 is satisfied, based on the time for which the second processor 210 occupies the security subsystem 230 or 310 while performing the security function related to the at least one job through the security subsystem 230 or 310. When the time for which the second processor 210 occupies the security subsystem 230 or 310 is less than the designated reference time, the second processor 210 may determine that the designated occupancy condition related to the security subsystem 230 or 310 is satisfied. When the time for which the second processor 210 occupies the security subsystem 230 or 310 is the designated reference time or greater, the second processor 210 may determine that the designated occupancy condition related to the security subsystem 230 or 310 is not satisfied.

When determining that the designated occupancy condition related to the security subsystem 230 or 310 is satisfied (e.g., "Yes" in operation 1407), the electronic device (e.g., the second processor 210) may perform the security function related to the at least one job through the security subsystem 230 or 310 in operation 1405.

When determining that the designated occupancy condition related to the security subsystem 230 or 310 is not satisfied (e.g., "No" in operation 1407), the electronic device (e.g., the second processor 210) may return (or give back) the authority to access the security subsystem 230 or 310 in operation 1409. When the time for which the second processor 210 occupies the security subsystem 230 or 310 is the designated reference time or greater, the second processor 210 may transmit the request signal related to the return of the authority to access the security subsystem 230 or 310 to the authority assignment device 220 regardless of whether the at least one job is completed. In one example, the request signal related to the return of the authority may include information (e.g., identification information) related to the processor requesting the return of the authority and/or a second value (e.g., "0"), which is different from a first value for requesting the authority.

The electronic device 101 may limit the time for which the second processor 210 occupies the security subsystem 230 or 310 to the designated reference time, thereby providing security for the first processor 200 to perform the security function through the security subsystem 230 or 310.

When completely performing the security function related to the at least one job through the security subsystem 230 or 310 in the occupancy time of the security subsystem 230 or 310 which is less than the designated reference time, the second processor 210 may transmit the request signal related to the return of the authority to access the security subsystem 230 or 310 to the authority assignment device 220.

The electronic device 101 may limit time for which the first processor 200 occupies the security subsystem 230 or 310 to the designated reference time in addition to that of the second processor 210.

Figure 15A:
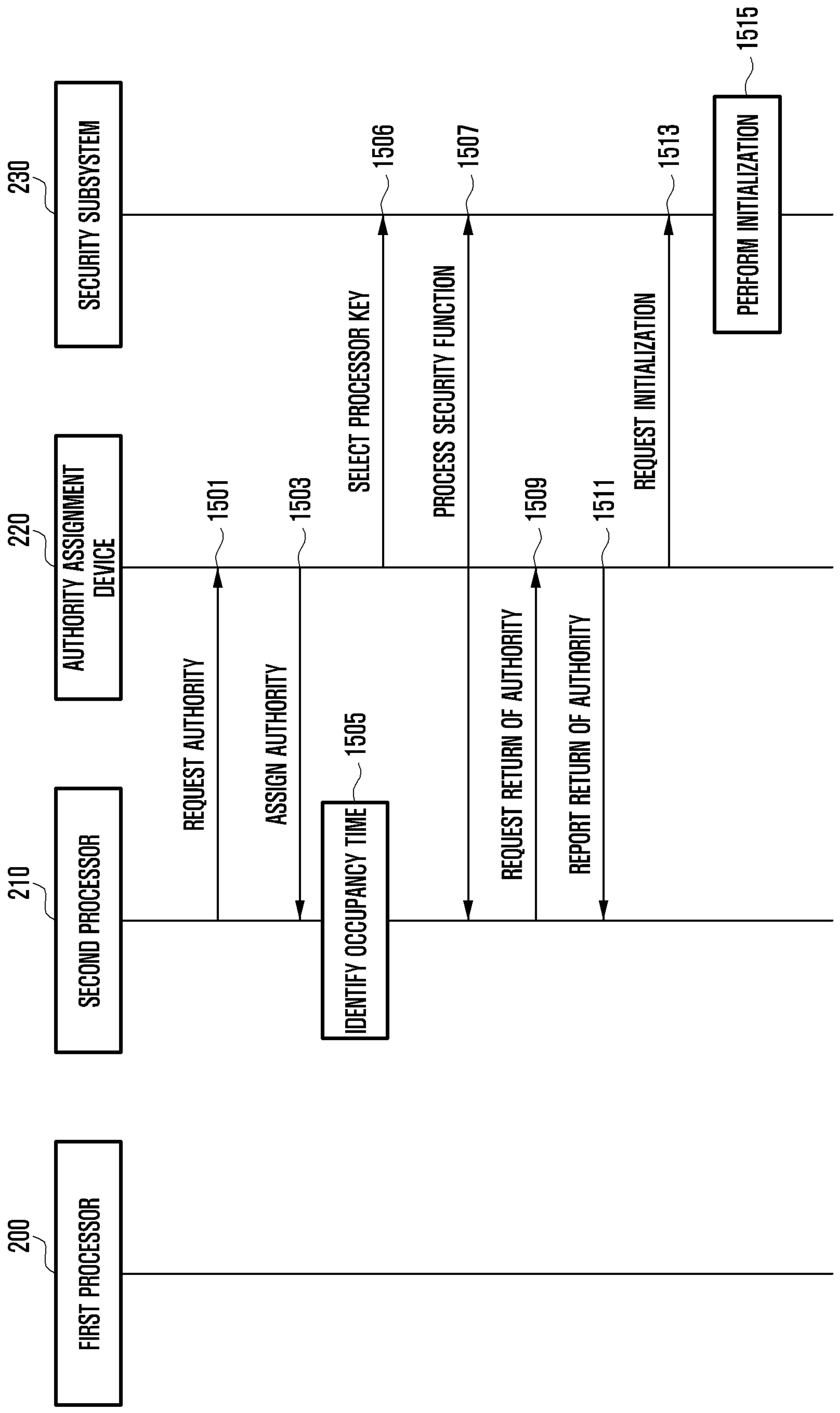
FIG. 15A illustrates an example in which an electronic device requests authority to access a security device according to an embodiment of the disclosure.

FIG. 15A illustrates an example in which an electronic device requests authority to access a security device (e.g., the security subsystem 230) according to an embodiment of the disclosure.

Referring to FIG. 15A, when there is at least one job related to a security function, a second processor 210 of the electronic device 101 may transmit a request signal related to authority to access the security subsystem 230 to an authority assignment device 220 in operation 1501. In one example, the request signal related to the authority may include information (e.g., identification information) related to the second processor 210 requesting the authority and/or a first value (e.g., "1") indicating a request for the authority.

The authority assignment device 220 may assign authority to access the security subsystem 230 to the second processor 210, based on the request signal related to the authority to access the security subsystem 230 received from the second processor 210. The authority assignment device 220 may transmit a signal (e.g., an ACK signal) related to assignment of the authority to access the security subsystem 230 to the second processor 210 in operation 1503. When there is no processor assigned authority to access the security subsystem 230, the authority assignment device 220 may assign authority to access the security subsystem 230 to the second processor 210. When there is a process assigned authority to access the security subsystem 230, the authority assignment device 220 may identify whether the authority to access the security subsystem 230 is withdrawn. When the authority to access the security subsystem 230 is withdrawn, the authority assignment device 220 may assign authority to access the security subsystem 230 to the second processor 210. For example, when receiving a plurality of request signals for authority to access the security subsystem 230, the authority assignment device 220 may assign authority to access the security subsystem 230 to the second processor 210, based on an authority assignment method, time of requesting access authority, and the priority of access authority.

When assigning the authority to access the security subsystem 230 to the second processor 210, the authority assignment device 220 may transmit information related to the assignment of the authority to the second processor 210 (e.g., instruction information related to key selection of the second processor 210) to the security subsystem 230 in operation 1506. The security subsystem 230 may obtain a key of the second processor 210, based on the information related to the assignment of the authority to the second processor 210 (e.g., instruction information related to key selection of the second processor 210) received from the authority assignment device 220. In one example, the key of the second processor 210 may be obtained from the second processor key management module 243 through the processor key selection module 241 included in the processor key management module 233 of FIG. 2B. In one example, the key of the second processor 210 is a root key of the second processor 210 assigned the authority to access the security subsystem 230, and may include an OTP or an eFuse.

When assigned the authority to access the security subsystem 230 from the authority assignment device 220, the second processor 210 may identify time for which the second processor 210 occupies the security subsystem 230 in operation 1505. When receiving the signal (e.g., the ACK signal) related to the assignment of the authority to access the security subsystem 230 from the authority assignment device 220, the second processor 210 may run a timer. The second processor 210 may identify the time for which the second processor 210 occupies the security subsystem 230, based on the running time of the timer.

When determining that it is possible to process the security function related to the at least one job of the second processor 210, based on the time for which the second processor 210 occupies the security subsystem 230, the second processor 210 may perform the security function through the security subsystem 230 in operation 1507. The second processor 210 may detect time available for the second processor 210 to use the security subsystem 230, based on the time for which the second processor 210 occupies the security subsystem 230 and a designated reference time. The second processor 210 may identify whether it is possible to process the security function related to the at least one job of the second processor 210 for the time available for the second processor 210 to use the security subsystem 230. When determining that it is possible to process the security function related to the at least one job, the second processor 210 may perform the security function related to the at least one job through the security subsystem 230. The security subsystem 230 may process the security function of the second processor 210, based on the key of the second processor 210. For example, the security function may include at least one of functions of encrypting a RAM related to the second processor 210, encrypting critical data (e.g., an IMEI or an MEID) related to the second processor 210, decrypting the critical data related to the second processor 210, generating an authentication certificate and/or a signature for the critical data related to the second processor 210, a check for the authentication certificate and/or the signature for the critical data related to the second processor 210, or generating an encryption key. For example, the security function may include a function of encrypting critical data (e.g., payment data) related to a first processor 200 and/or generating an encryption key.

When completely processing the at least one job related to the security function, the second processor 210 may request return (or giving-back) of the authority to access the security subsystem 230 in operation 1509. When completely processing the at least one job related to the security function within the designated reference time, the second processor 210 may transmit a request signal related to the return of the authority to access the security subsystem 230 to the authority assignment device 220. In one example, the request signal related to the return of the authority may include the information (e.g., the identification information) related to the second processor 210 requesting the return of the authority and/or a second value (e.g., "0") indicating the return of the authority, which is different from the first value.

The authority assignment device 220 may withdraw the authority of the second processor 210 to access the security subsystem 230, based on a request for the return of the authority to access the security subsystem 230 from the second processor 210. The authority assignment device 220 may transmit information (e.g., authority return notification information) related to the return of the authority to access the security subsystem 230 to the second processor 210 in operation 1511.

The authority assignment device 220 may control the security subsystem 230 to delete data related to the second processor 210, based on the return of the authority of the second processor 200 to access the security subsystem 230 in operation 1513. When withdrawing the authority to access the security subsystem 230 from the second processor 210, the authority assignment device 220 may transmit an initialization request signal to the security subsystem 230 in operation 1513.

The security subsystem 230 may initialize the security subsystem 230, based on the initialization request signal received from the authority assignment device 220 in operation 1515. The security subsystem 230 may delete the information related to the second processor 210 existing in an internal memory of the security subsystem 230 and/or a register path through initialization of the security subsystem 230. For example, the information related to the second processor 210 may include the key of the second processor 210 and/or operation information based on the key of the second processor 210.

The authority assignment device 220 may withdraw the authority of the second processor 210 to access the security subsystem 230 regardless of the request for the return (or giving-back) of the authority to access the security subsystem 230 from the second processor 210. When determining that the time for which the second processor 210 occupies the security subsystem 230 exceeds the designated reference time, the authority assignment device 220 may withdraw the authority of the second processor 210 to access the security subsystem 230. The authority assignment device 220 may transmit the information (e.g., the authority return notification information) related to the return (or giving-back) of the authority to access the security subsystem 230 to the second processor 210, based on withdrawal of the authority of the second processor 210 to access the security subsystem 230 in operation 1511. For example, operation 1511 of FIG. 15A may be omitted.

Figure 15B:
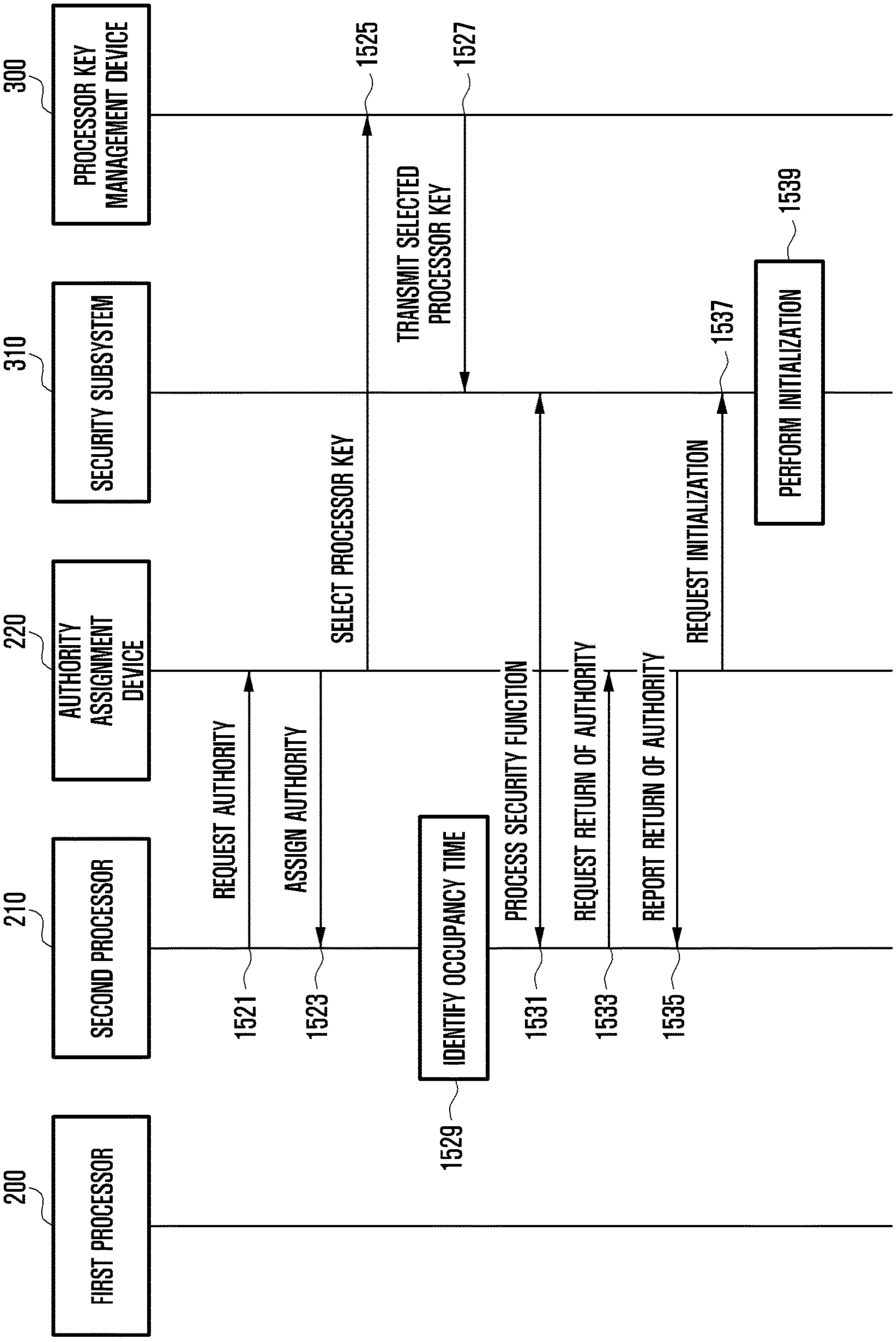
FIG. 15B illustrates an example in which an electronic device requests authority to access a security device according to an embodiment of the disclosure.

FIG. 15B illustrates an example in which an electronic device requests authority to access a security device (e.g., the security subsystem 310) according to an embodiment of the disclosure.

Referring to FIG. 15B, when there is at least one job related to a security function, a second processor 210 of the electronic device 101 may transmit a request signal related to authority to access the security subsystem 310 to an authority assignment device 220 in operation 1521.

The authority assignment device 220 may assign authority to access the security subsystem 310 to the second processor 210, based on the request signal related to the authority to access the security subsystem 310 received from the second processor 210. The authority assignment device 220 may transmit a signal (e.g., an ACK signal) related to assignment of the authority to access the security subsystem 310 to the second processor 210 in operation 1523. For example, operation 1521 and operation 1523 of FIG. 15B may include operations corresponding to (or the same as) operation 1501 and operation 1503 of FIG. 15A.

When assigning the authority to access the security subsystem 310 to the second processor 210, the authority assignment device 220 may transmit information related to the assignment of the authority to the second processor 210 (e.g., instruction information related to key selection of the second processor 210) to a processor key management device 300 in operation 1525.

The processor key management device 300 may select a key of the second processor 210, based on the information related to the assignment of the authority to the second processor 210 (e.g., instruction information related to key selection of the second processor 210) received from the authority assignment device 220. The processor key management device 300 may provide information related to the key of the second processor 210 (or the key of the second processor 210) to the security subsystem 310 in operation 1527. In one example, the key of the second processor 210 may be obtained from the second processor key management module 306 by the processor key selection module 302 of FIG. 3.

When assigned the authority to access the security subsystem 310 from the authority assignment device 220, the second processor 210 may identify time for which the second processor 210 occupies the security subsystem 310 in operation 1529. When receiving the signal (e.g., the ACK signal) related to the assignment of the authority to access the security subsystem 310 from the authority assignment device the time for which the second processor 210 occupies the security subsystem 310, based on the running time of the timer.

When determining that it is possible to process the security function related to the at least one job of the second processor 210, based on the time for which the second processor 210 occupies the security subsystem 310, the second processor 210 may perform the security function through the security subsystem 310 in operation 1531. The second processor 210 may detect time available for the second processor 210 to use the security subsystem 310, based on the time for which the second processor 210 occupies the security subsystem 310 and a designated reference time. The second processor 210 may identify whether it is possible to process the security function related to the at least one job of the second processor 210 for the time available for the second processor 210 to use the security subsystem 310. When determining that it is possible to process the security function related to the at least one job, the second processor 210 may perform the security function related to the at least one job through the security subsystem 310. The security subsystem 310 may process the security function of the second processor 210, based on the key of the second processor 210.

When completely processing the at least one job related to the security function, the second processor 210 may request return (or giving-back) of the authority to access the security subsystem 310 in operation 1533. When completely processing the at least one job related to the security function within the designated reference time, the second processor 210 may transmit a request signal related to the return of the authority to access the security subsystem 310 to the authority assignment device 220. In one example, the request signal related to the return of the authority may include information (e.g., identification information) related to the second processor 210 requesting the return of the authority and/or a second value (e.g., "0") indicating the return of the authority, which is different from a first value.

The authority assignment device 220 may withdraw the authority of the second processor 210 to access the security subsystem 310, based on a request for the return of the authority to access the security subsystem 310 from the second processor 210. The authority assignment device 220 may transmit information (e.g., authority return notification information) related to the return of the authority to access the security subsystem 310 to the second processor 210 in operation 1535.

The authority assignment device 220 may control the security subsystem 310 to delete data related to the second processor 210, based on the return of the authority of the second processor 210 to access the security subsystem 310 in operation 1537. According to an embodiment, when withdrawing the authority to access the security subsystem 310 from the second processor 210, the authority assignment device 220 may transmit an initialization request signal to the security subsystem 310 in operation 1537.

The security subsystem 310 may initialize the security subsystem 310, based on the initialization request signal received from the authority assignment device 220 in operation 1539. The security subsystem 310 may delete the information related to the second processor 210 existing in an internal memory of the security subsystem 310 and/or a register path through initialization of the security subsystem 310. For example, the information related to the second processor 210 may include the key of the second processor 210 and/or operation information based on the key of the second processor 210.

The authority assignment device 220 may withdraw the authority of the second processor 210 to access the security subsystem 230 regardless of the request for the return (or giving-back) of the authority to access the security subsystem 230 from the second processor 210. When determining that the time for which the second processor 210 occupies the security subsystem 230 exceeds the designated reference time, the authority assignment device 220 may withdraw the authority of the second processor 210 to access the security subsystem 230. The authority assignment device 220 may transmit the information (e.g., the authority return notification information) related to the return (or giving-back) of the authority to access the security subsystem 230 to the second processor 210, based on withdrawing of the authority of the second processor 210 to access the security subsystem 230 in operation 1535. For example, operation 1533 of FIG. 15B may be omitted.

Figure 16A:
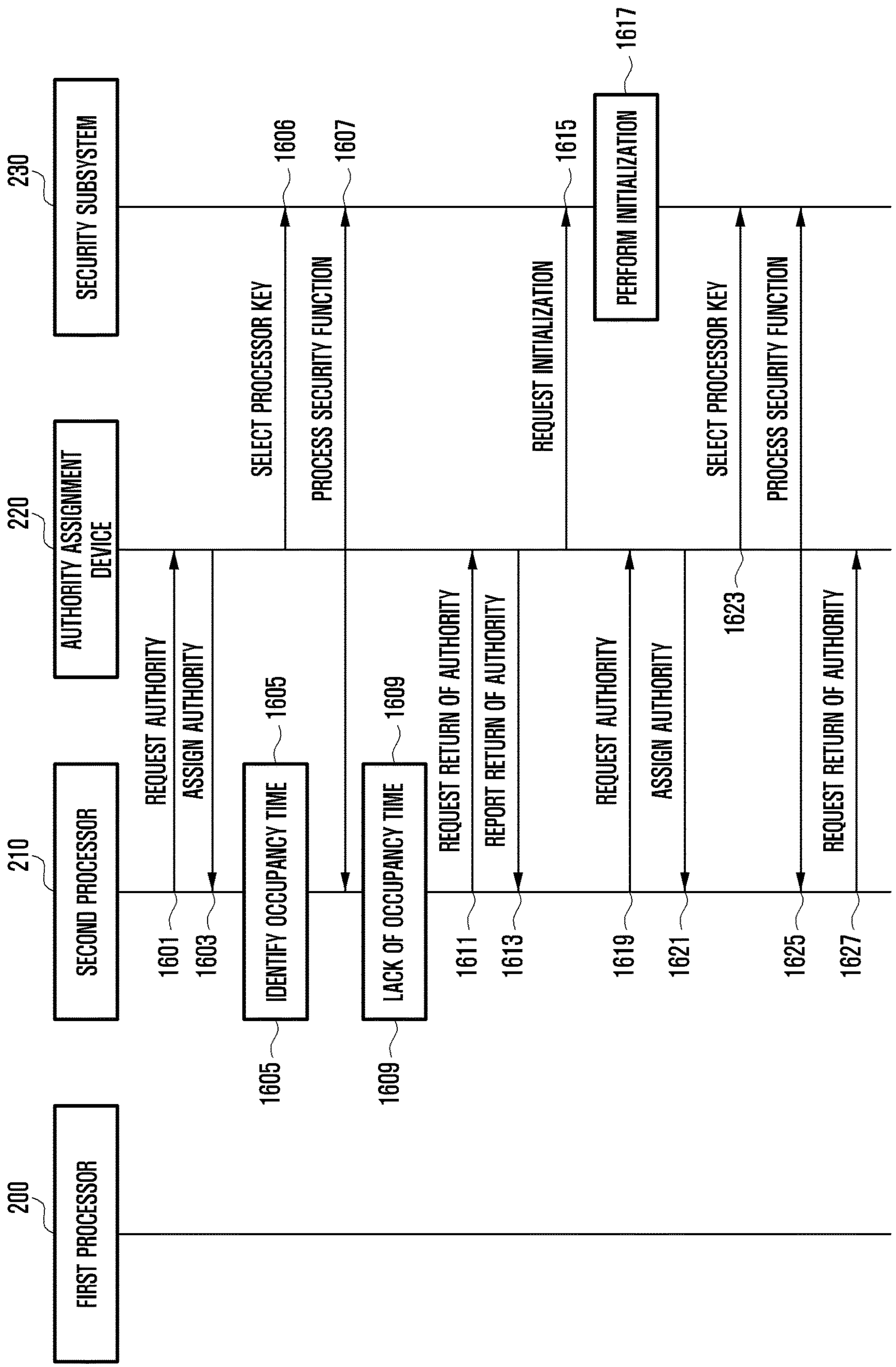
FIG. 16A illustrates an example in which an electronic device returns authority to access a security device according to an embodiment of the disclosure.

FIG. 16A illustrates an example in which an electronic device returns authority to access a security device (e.g., the security subsystem 230) according to an embodiment of the disclosure.

Referring to FIG. 16A, when there is at least one job related to a security function, a second processor 210 of the electronic device 101 may transmit a request signal related to authority to access the security subsystem 230 to an authority assignment device 220 in operation 1601. In one example, the request signal related to the authority may include information (e.g., identification information) related to the second processor 210 requesting the authority and/or a first value (e.g., "1") indicating a request for the authority.

The authority assignment device 220 may assign authority to access the security subsystem 230 to the second processor 210, based on the request signal related to the authority to access the security subsystem 230 received from the second processor 210. The authority assignment device 220 may transmit a signal (e.g., an ACK signal) related to assignment of the authority to access the security subsystem 230 to the second processor 210 in operation 1603. When there is no processor assigned authority to access the security subsystem 230, the authority assignment device 220 may assign authority to access the security subsystem 230 to the second processor 210. When withdrawing authority to access the security subsystem 230, the authority assignment device 220 may assign authority to access the security subsystem 230 to the second processor 210, based on an authority assignment method, time of requesting access authority, and the priority of access authority.

When assigning the authority to access the security subsystem 230 to the second processor 210, the authority assignment device 220 may transmit information related to the assignment of the authority to the second processor 210 (e.g., instruction information related to key selection of the second processor 210) to the security subsystem 230 (e.g., operation 1606). The security subsystem 230 may obtain a key of the second processor 210, based on the information related to the assignment of the authority to the second processor 210 (e.g., instruction information related to key selection of the second processor 210) received from the authority assignment device 220. In one example, the key of the second processor 210 may be obtained from the second processor key management module 243 through the processor key selection module 241 included in the processor key management module 233 of FIG. 2B.

When assigned the authority to access the security subsystem 230 from the authority assignment device 220, the second processor 210 may identify time for which the second processor 210 occupies the security subsystem 230 in operation 1605. When receiving the signal (e.g., the ACK signal) related to the assignment of the authority to access the security subsystem 230 from the authority assignment device 220, the second processor 210 may run a timer. The second processor 210 may identify the time for which the second processor 210 occupies the security subsystem 230, based on the running time of the timer.

When determining that it is possible to process the security function related to the at least one job of the second processor 210, based on the time for which the second processor 210 occupies the security subsystem 230, the second processor 210 may perform the security function through the security subsystem 230 in operation 1607. The security subsystem 230 may process the security function of the second processor 210, based on the key of the second processor 210.

The second processor 210 may identify whether a designated occupancy condition related to the security subsystem 230 is satisfied while performing the security function through the security subsystem 230 in operation 1609. When the time for which the second processor 210 occupies the security subsystem 230 is less than a designated reference time, the second processor 210 may determine that the designated occupancy condition related to the security subsystem 230 is satisfied. When the time for which the second processor 210 occupies the security subsystem 230 is the designated reference time or greater, the second processor 210 may determine that the designated occupancy condition related to the security subsystem 230 is not satisfied.

When determining that the designated occupancy condition related to the security subsystem 230 is not satisfied in operation 1609, the second processor 210 may request return (or giving-back) of the authority to access the security subsystem 230 in operation 1611. When the time for which the second processor 210 occupies the security subsystem 230 is the designated reference time or greater, the second processor 210 may transmit a request signal related to the return of the authority to access the security subsystem 230 to the authority assignment device 220 regardless of whether the at least one job is completed in operation 1611. In one example, the request signal related to the return of the authority may include the information (e.g., the identification information) related to the second processor 210 requesting the return of the authority and/or a second value (e.g., "0") indicating the return of the authority, which is different from the first value.

The authority assignment device 220 may withdraw the authority of the second processor 210 to access the security subsystem 230, based on a request for the return of the authority to access the security subsystem 230 from the second processor 210. The authority assignment device 220 may transmit information (e.g., authority return notification information) related to the return of the authority to access the security subsystem 230 to the second processor 210 in operation 1613.

The authority assignment device 220 may control the security subsystem 230 to delete data related to the second processor 210, based on the return of the authority of the second processor 200 to access the security subsystem 230 in operation 1615. When withdrawing the authority to access the security subsystem 230 from the second processor 210, the authority assignment device 220 may transmit an initialization request signal to the security subsystem 230 in operation 1615.

The security subsystem 230 may initialize the security subsystem 230, based on the initialization request signal received from the authority assignment device 220 in operation 1617. The security subsystem 230 may delete the information related to the second processor 210 existing in an internal memory of the security subsystem 230 and/or a register path through initialization of the security subsystem 230. For example, the information related to the second processor 210 may include the key of the second processor 210 and/or operation information based on the key of the second processor 210.

When not completing the at least one job, based on the designated reference time, the second processor 210 may transmit a request signal related to authority to access the security subsystem 230 to the authority assignment device 220 in operation 1619.

The authority assignment device 220 may assign authority to access the security subsystem 230 to the second processor 210, based on the request signal related to the authority to access the security subsystem 230 received from the second processor 210 in operation 1621. The authority assignment device 220 may transmit a signal (e.g., an ACK signal) related to assignment of the authority to access the security subsystem 230 to the second processor 210 in operation 1621.

When assigning the authority to access the security subsystem 230 to the second processor 210, the authority assignment device 220 may transmit the information related to the assignment of the authority to the second processor 210 (e.g., the instruction information related to key selection of the second processor 210) to the security subsystem 230 (e.g., operation 1623). The security subsystem 230 may obtain the key of the second processor 210, based on the information related to the assignment of the authority to the second processor 210 (e.g., instruction information related to key selection of the second processor 210) received from the authority assignment device 220. In one example, the key of the second processor 210 may be obtained from the second processor key management module 243 through the processor key selection module 241 included in the processor key management module 233 of FIG. 2B.

When assigned the authority to access the security subsystem 230 from the authority assignment device 220, the second processor 210 may perform the security function through the security subsystem 230 in operation 1625. When receiving the signal (e.g., the ACK signal) related to the assignment of the authority to access the security subsystem 230 from the authority assignment device 220, the second processor 210 may run (e.g., reset) the timer. The second processor 210 may identify time for which the second processor 210 occupies the security subsystem 230, based on the running time of the timer. When determining that it is possible to process the security function related to the at least one job of the second processor 210, based on the time for which the second processor 210 occupies the security subsystem 230, the second processor 210 may perform the security function through the security subsystem 230. The security subsystem 230 may process the security function of the second processor 210, based on the key of the second processor 210.

When completely processing the at least one job related to the security function, the second processor 210 may return (or give back) the authority to access the security subsystem 230 in operation 1627. When completely processing the at least one job related to the security function within the designated reference time, the second processor 210 may transmit a request signal related to the return of the authority to access the security subsystem 230 to the authority assignment device 220 in operation 1627. In one example, the request signal related to the return of the authority may include the information (e.g., the identification information) related to the second processor 210 requesting the return of the authority and/or the second value (e.g., "0") indicating the return of the authority, which is different from the first value.

The authority assignment device 220 may withdraw the authority of the second processor 210 to access the security subsystem 230 regardless of the request for the return (or giving-back) of the authority to access the security subsystem 230 from the second processor 210. When determining that the time for which the second processor 210 occupies the security subsystem 230 exceeds the designated reference time, the authority assignment device 220 may withdraw the authority of the second processor 210 to access the security subsystem 230. The authority assignment device 220 may transmit the information (e.g., the authority return notification information) related to the return (or giving-back) of the authority to access the security subsystem 230 to the second processor 210, based on withdrawal of the authority of the second processor 210 to access the security subsystem 230 in operation 1613. For example, operation 1611 and operation 1627 of FIG. 16A may be omitted.

Figure 16B:
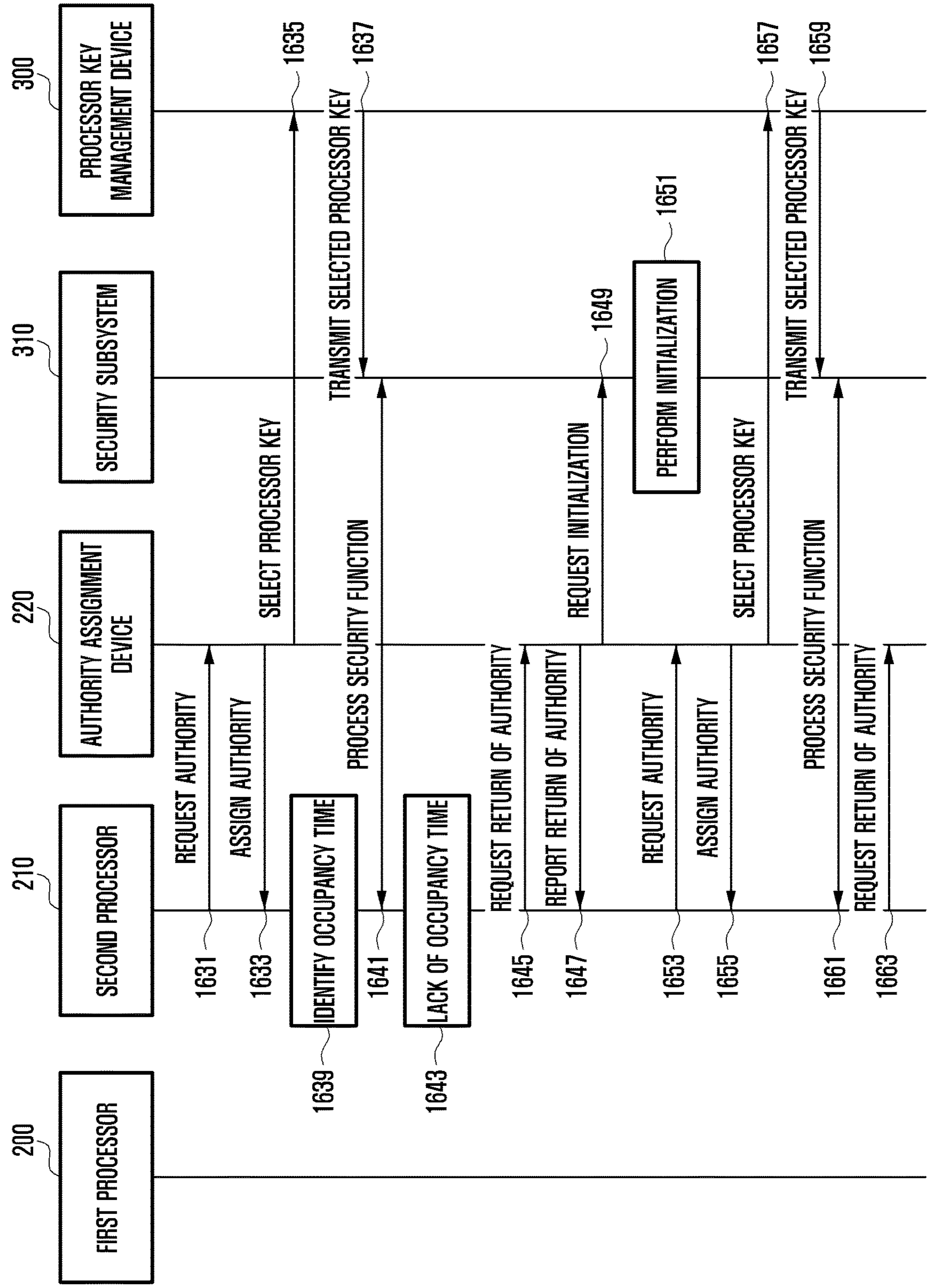
FIG. 16B illustrates an example in which an electronic device returns authority to access a security device according to an embodiment of the disclosure.

FIG. 16B illustrates an example in which an electronic device returns authority to access a security device (e.g., the security subsystem 310) according to an embodiment of the disclosure.

Referring to FIG. 16B, when there is at least one job related to a security function, a second processor 210 of the electronic device 101 may transmit a request signal related to authority to access the security subsystem 310 to an authority assignment device 220 in operation 1631.

The authority assignment device 220 may assign authority to access the security subsystem 310 to the second processor 210, based on the request signal related to the authority to access the security subsystem 310 received from the second processor 210. The authority assignment device 220 may transmit a signal (e.g., an ACK signal) related to assignment of the authority to access the security subsystem 310 to the second processor 210 in operation 1633. For example, operation 1631 and operation 1633 of FIG. 16B may include operations corresponding to (or the same as) operation 1601 and operation 1603 of FIG. 16A.

When assigning the authority to access the security subsystem 310 to the second processor 210, the authority assignment device 220 may transmit information related to the assignment of the authority to the second processor 210 (e.g., instruction information related to key selection of the second processor 210) to a processor key management device 300 in operation 1635.

The processor key management device 300 may select a key of the second processor 210, based on the information related to the assignment of the authority to the second processor 210 (e.g., the instruction information related to key selection of the second processor 210) received from the authority assignment device 220. The processor key management device 300 may provide information related to the key of the second processor 210 (or the key of the second processor 210) to the security subsystem 310 in operation 1637. In one example, the key of the second processor 210 may be obtained from the second processor key management module 306 by the processor key selection module 302 of FIG. 3.

When assigned the authority to access the security subsystem 310 from the authority assignment device 220, the second processor 210 may identify time for which the second processor 210 occupies the security subsystem 310 in operation 1639. When receiving the signal (e.g., the ACK signal) related to the assignment of the authority to access the security subsystem 310 from the authority assignment device the time for which the second processor 210 occupies the security subsystem 310, based on the running time of the timer.

When determining that it is possible to process the security function related to the at least one job of the second processor 210, based on the time for which the second processor 210 occupies the security subsystem 310, the second processor 210 may perform the security function through the security subsystem 310 in operation 1641. The security subsystem 310 may process the security function of the second processor 210, based on the key of the second processor 210.

The second processor 210 may identify whether a designated occupancy condition related to the security subsystem 310 is satisfied while performing the security function through the security subsystem 310 in operation 1643. When the time for which the second processor 210 occupies the security subsystem 310 is less than a designated reference time, the second processor 210 may determine that the designated occupancy condition related to the security subsystem 310 is satisfied. When the time for which the second processor 210 occupies the security subsystem 310 is the designated reference time or greater, the second processor 210 may determine that the designated occupancy condition related to the security subsystem 310 is not satisfied.

When determining that the designated occupancy condition related to the security subsystem 310 is not satisfied in operation 1643, the second processor 210 may request return (or giving-back) of the authority to access the security subsystem 310 in operation 1645. When the time for which the second processor 210 occupies the security subsystem 310 is the designated reference time or greater, the second processor 210 may transmit a request signal related to the return of the authority to access the security subsystem 310 to the authority assignment device 220 regardless of whether the at least one job is completed in operation 1645.

The authority assignment device 220 may withdraw the authority of the second processor 210 to access the security subsystem 310, based on a request for the return of the authority to access the security subsystem 310 from the second processor 210. The authority assignment device 220 may transmit information (e.g., authority return notification information) related to the return of the authority to access the security subsystem 310 to the second processor 210 in operation 1647.

The authority assignment device 220 may control the security subsystem 310 to delete data related to the second processor 210, based on the return of the authority of the second processor 200 to access the security subsystem 310 in operation 1649. When withdrawing the authority to access the security subsystem 310 from the second processor 210, the authority assignment device 220 may transmit an initialization request signal to the security subsystem 310 in operation 1649.

The security subsystem 310 may initialize the security subsystem 310, based on the initialization request signal received from the authority assignment device 220 in operation 1651. The security subsystem 310 may delete the information related to the second processor 210 existing in an internal memory of the security subsystem 310 and/or a register path through initialization of the security subsystem 310. For example, the information related to the second processor 210 may include the key of the second processor 210 and/or operation information based on the key of the second processor 210.

When not completing the at least one job, based on the designated reference time, the second processor 210 may transmit a request signal related to authority to access the security subsystem 310 to the authority assignment device 220 in operation 1653.

The authority assignment device 220 may assign authority to access the security subsystem 310 to the second processor 210, based on the request signal related to the authority to access the security subsystem 310 received from the second processor 210 in operation 1655. The authority assignment device 220 may transmit a signal (e.g., an ACK signal) related to assignment of the authority to access the security subsystem 310 to the second processor 210 in operation 1655.

When assigning the authority to access the security subsystem 310 to the second processor 210, the authority assignment device 220 may transmit the information related to the assignment of the authority to the second processor 210 (e.g., the instruction information related to key selection of the second processor 210) to the processor key management device 300 in operation 1657.

The processor key management device 300 may select the key of the second processor 210, based on the information related to the assignment of the authority to the second processor 210 (e.g., the instruction information related to key selection of the second processor 210) received from the authority assignment device 220. The processor key management device 300 may provide the information related to the key of the second processor 210 (or the key of the second processor 210) to the security subsystem 310 in operation 1659. In one example, the key of the second processor 210 may be obtained from the second processor key management module 306 by the processor key selection module 302 of FIG. 3.

When assigned the authority to access the security subsystem 310 from the authority assignment device 220, the second processor 210 may perform the security function through the security subsystem 310 in operation 1661. When receiving the signal (e.g., the ACK signal) related to the assignment of the authority to access the security subsystem 310 from the authority assignment device 220, the second processor 210 may run (e.g., reset) the timer. The second processor 210 may identify the time for which the second processor 210 occupies the security subsystem 310, based on the running time of the timer. When determining that it is possible to process the security function related to the at least one job of the second processor 210, based on the time for which the second processor 210 occupies the security subsystem 310, the second processor 210 may perform the security function through the security subsystem 310. The security subsystem 310 may process the security function of the second processor 210, based on the key of the second processor 210.

When completely processing the at least one job related to the security function, the second processor 210 may return (or give back) the authority to access the security subsystem 310 in operation 1663. According to an embodiment, when completely processing the at least one job related to the security function within the designated reference time, the second processor 210 may transmit a request signal related to the return of the authority to access the security subsystem 310 to the authority assignment device 220 in operation 1663.

The authority assignment device 220 may withdraw the authority of the second processor 210 to access the security subsystem 230 regardless of the request for the return (or giving-back) of the authority to access the security subsystem 230 from the second processor 210. When determining that the time for which the second processor 210 occupies the security subsystem 230 exceeds the designated reference time, the authority assignment device 220 may withdraw the authority of the second processor 210 to access the security subsystem 230. The authority assignment device 220 may transmit the information (e.g., the authority return notification information) related to the return (or giving-back) of the authority to access the security subsystem 230 to the second processor 210, based on withdrawal of the authority of the second processor 210 to access the security subsystem 230 in operation 1647. For example, operation 1645 and operation 1663 of FIG. 16B may be omitted.

Figure 17:
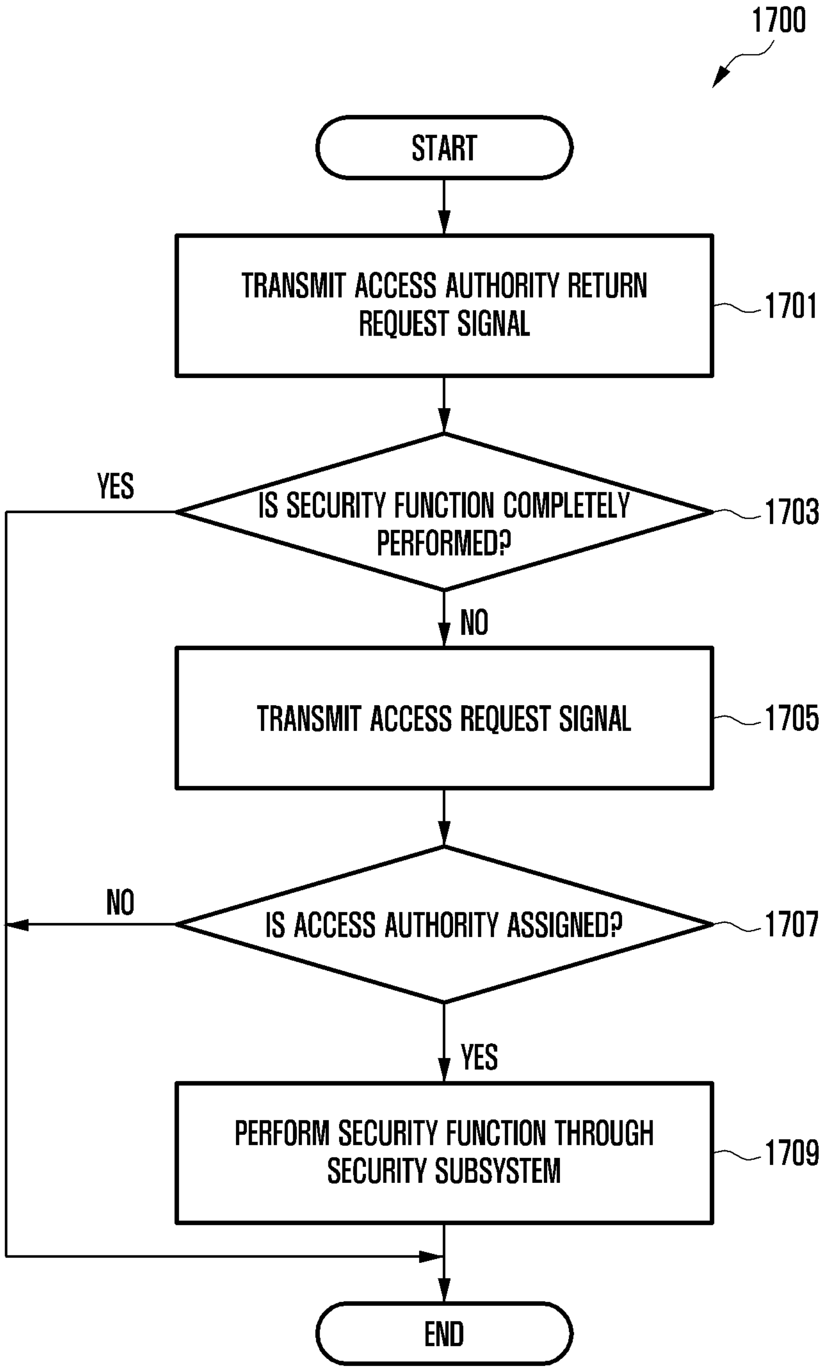
FIG. 17 is a flowchart illustrating that an electronic device performs a security function through a security device according to an embodiment of the disclosure.

FIG. 17 is a flowchart 1700 illustrating that an electronic device performs a security function through a security device (e.g., the security subsystem 230 or 310) according to an embodiment of the disclosure.

Referring to FIG. 17, the illustrated operations may be sequentially performed, but are not necessarily performed sequentially. For example, the operations may be performed in a different order, or at least two operations may be performed in parallel. For example, the electronic device of FIG. 17 may be the electronic device 101 of FIG. 1 or 2.

Referring to FIG. 17, when determining that a designated occupancy condition related to the security subsystem 230 or 310 is not satisfied (e.g., "No" in operation 1407 of FIG. 14), the electronic device (e.g., the second processor 210 of FIG. 2) may return (or give back) authority to access the security subsystem 230 or 310 in operation 1701. When a time for which the second processor 210 occupies the security subsystem 230 or 310 is a designated reference time or greater, the second processor 210 may transmit a request signal related to return of the authority to access the security subsystem 230 or 310 to the authority assignment device 220 regardless of whether at least one job is completed. In one example, the request signal related to the return of the authority may include a second value (e.g., "0") indicating the return of the authority, which is different from a first value.

In operation 1703, the electronic device (e.g., the second processor 210) may identify whether the security function is completely processed using the security subsystem 230 or 310. When completing the security function being processed through the security subsystem 230 or 310, based on the second processor 210 occupying the security subsystem 230 or 310 for the designated reference time, the second processor 210 may determine that there is at least one job for which the security function is not completely processed using the security subsystem 230 or 310.

When determining that the security function is completely processed using the security subsystem 230 or 310 (e.g., "Yes" in operation 1703), the electronic device (e.g., the second processor 210) may terminate an embodiment of performing the security function through the security subsystem 230 or 310.

When determining that the security function is not completely processed using the security subsystem 230 or 310 (e.g., "No" in operation 1703), the electronic device (e.g., the second processor 210) may transmit a request signal related to authority to access the security subsystem 230 or 310 to the authority assignment device 220 in operation 1705. In one example, the request signal related to the authority may include information (e.g., identification information) related to the second processor 210 requesting the authority and/or the first value (e.g., "1") indicating a request for the authority.

In operation 1707, the electronic device (e.g., the first processor 200 and/or the second processor 210) may identify whether authority to access the security subsystem 230 or 310 is assigned from the authority assignment device 220.

When determining that the authority to access the security subsystem 230 or 310 is not assigned from the authority assignment device 220 (e.g., "No" in operation 1707), the electronic device (e.g., the first processor 200 and/or the second processor 210) may terminate the embodiment of performing the security function through the security subsystem 230 or 310.

When determining that the authority to access the security subsystem 230 or 310 is assigned from the authority assignment device 220 (e.g., "Yes" in operation 1707), the electronic device (e.g., the first processor 200 and/or the second processor 210) may perform the security function related to the at least one job, which is not completely processed through the security subsystem 230 or 310 in operation 1709. The second processor 210 may sequentially transmit an authority request signal corresponding to a first job and an authority request signal corresponding to a second job to the authority assignment device 220. When the second processor 210 is assigned the authority to access the security subsystem 230 or 310 but fails to complete the first job, based on the designated reference time, the second processor 210 may transmit a request signal corresponding to the first job to the authority assignment device 220. When the second processor 210 is assigned authority to access the security subsystem 230 or 310 from the authority assignment device 220, based on the authority request signal corresponding to the second job, the second processor 210 may preferentially perform a security function related to the first job, which has not been completely processed based on the designated reference time, before the second job. In one example, an authority request signal may include a request signal related to authority to access the security subsystem 230 or 310.

According to various embodiments of the disclosure, an operating method of an electronic device (e.g., the electronic device 101 of FIG. 1, 2A, or 3) including an application processor (e.g., the main processor 121 of FIG. 1 or the first processor 200 of FIG. 2A or 3) and a communication processor (e.g., the coprocessor 123 of FIG. 1 or the second processor 210 of FIG. 2A or 3) may include assigning authority to access a security subsystem (e.g., the security subsystem 230 or 310 of FIG. 2A or 3) configured to process a security function related to the application processor or the communication processor to the application processor or the communication processor, obtaining a key related to the application processor or the communication processor when assigning the authority to access the security subsystem to the application processor or the communication processor, processing a security function related to the application processor or the communication processor through the security subsystem, based on the key related to the application processor or the communication processor, and initializing data related to the application processor or the communication processor, based on returning the authority to access the security subsystem assigned to the application processor or the communication processor.

According to various embodiments, the assigning to the application processor or the communication processor may include alternately assigning the authority to access the security subsystem to the application processor or the communication processor when receiving a plurality of request signals related to the authority to access the security subsystem from the application processor and the communication processor.

According to various embodiments, the alternately assigning may include assigning the authority to access the security subsystem to the application processor, based on time of receiving at least one request signal related to the authority to access the security subsystem when receiving the at least one request signal from the communication processor after consecutively receiving a plurality of request signals related to the authority to access the security subsystem from the application processor, and assigning the authority to access the security subsystem to the communication processor when withdrawing the authority to access the security subsystem from the application processor.

According to various embodiments, the assigning to the application processor or the communication processor may include assigning the authority to access the security subsystem to the application processor or the communication processor, based on time of receiving an access request when receiving a request signal related to the authority to access the security subsystem from the application processor and/or the communication processor.

According to various embodiments, the assigning to the application processor or the communication processor may include identifying a processor for which priority in the authority to access the security subsystem is configured when receiving a plurality of request signals related to the authority to access the security subsystem from the application processor and the communication processor, assigning the authority to access the security subsystem to the application processor when the priority is configured for the application processor, and assigning the authority to access the security subsystem to the communication processor when determining that at least one job corresponding to a request signal related to the authority to access the security subsystem received from the application processor is completely processed.

According to various embodiments, the assigning to the application processor or the communication processor may include identifying a processor for which priority in the authority to access the security subsystem is configured when receiving a plurality of request signals related to the authority to access the security subsystem from the application processor and the communication processor, assigning the authority to access the security subsystem to the communication processor when the priority is configured for the communication processor, and assigning the authority to access the security subsystem to the application processor when determining that at least one job corresponding to a request signal related to the authority to access the security subsystem received from the communication processor is completely processed.

According to various embodiments, the method may include returning the authority to access the security subsystem regardless of completely processing the security function related to the communication processor when a designated reference time expires based on time when the authority to access the security subsystem is assigned to the communication processor.

According to various embodiments, the method may further include identifying whether there is a security function not completely processed based on the designated reference time with the authority to access the security subsystem previously assigned when the authority to access the security subsystem is assigned to the communication processor, and processing the security function not completely processed through the security subsystem when there is the security function not completely processed.

According to various embodiments, the method may further include performing the security function related to the application processor, based on the key corresponding to the application processor when the authority to access the security subsystem is assigned to the application processor, or performing the security function related to the communication processor, based on the key corresponding to the communication processor when the authority to access the security subsystem is assigned to the communication processor.

According to various embodiments, the method may further include returning the authority to access the security subsystem when the security function related to the communication processor is completely processed before time for which the authority to access the security subsystem is assigned to the communication processor exceeds the designated reference time.

According to various embodiments, the obtaining of the key related to the communication processor may include obtaining a root key related to the communication processor through a processor key management device (e.g., the processor key management device 300 of FIG. 3) separate from the security subsystem when the authority to access the security subsystem is assigned to the communication processor.

According to various embodiments, the method may further include obtaining a root key related to the application processor through a processor key management device separate from the security subsystem when the authority to access the security subsystem is assigned to the application processor, and processing the security function related to the application processor through the security subsystem, based on the key related to the application processor.

According to various embodiments, the method may include deleting a first key related to the application processor and data related to the security function of the application processor when receiving information related to return of the authority to access the security subsystem assigned to the application processor from the authority assignment device, and deleting a second key related to the communication processor and data related to the security function of the communication processor when receiving information related to return of the authority to access the security subsystem assigned to the communication processor from the authority assignment device.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

memory, comprising one or more storage media, storing instructions;

an application processor;

a communication processor;

a security subsystem comprising a processor key management device; and authority assignment circuitry configured to assign authority to access the security subsystem to the application processor or the communication processor;

wherein the instructions, when executed, cause the electronic device to:

assign, by the authority assignment circuitry, authority to access the security subsystem to the application processor or the communication processor, obtain, from the processor key management device, a first key related to the application processor or a second key related to the communication processor, based on the application processor or the communication processor assigned the authority to access the security subsystem from the authority assignment circuitry, process, by the security subsystem, a security function related to the application processor or the communication processor by using the first key or the second key provided from the processor key management device, based on the authority assignment circuitry assigning the authority to access the security subsystem to the application processor or the communication processor, initialize data related to the application processor or the communication processor, based on returning the authority to access the security subsystem assigned to the application processor or the communication processor, when the communication processor is assigned the authority of the access to the security subsystem from the authority assignment circuitry, run a timer configured to run for a designated reference time, when the timer expires, transmit a request signal returning the authority of the access to the security subsystem to the authority assignment circuitry regardless of a state of completion of the processing of the security function, and when a signal related to the assignment of the authority to access the security subsystem is received from the authority assignment circuitry, reset the timer.

2. The electronic device of claim 1, wherein the authority assignment circuitry is further configured to alternately assign the authority to access the security subsystem to the application processor or the communication processor in case of receiving a plurality of request signals related to the authority to access the security subsystem from the application processor and the communication processor.

3. The electronic device of claim 1, wherein the authority assignment circuitry is further configured to assign the authority to access the security subsystem to the application processor or the communication processor, based on time of receiving an access request in case of receiving a request signal related to the authority to access the security subsystem from the application processor and/or the communication processor.

4. The electronic device of claim 1, wherein the authority assignment circuitry is further configured to assign the authority to access the security subsystem to the application processor or the communication processor, based on priority in the authority to access the security subsystem in case of receiving a plurality of request signals related to the authority to access the security subsystem from the application processor and the communication processor.

5. The electronic device of claim 1, wherein the security subsystem is further configured to:

delete the first key and data related to the security function of the application processor in case of receiving information related to return of the authority to access the security subsystem assigned to the application processor from the authority assignment circuitry; and delete the second key and data related to the security function of the communication processor in case of receiving information related to return of the authority to access the security subsystem assigned to the communication processor from the authority assignment circuitry.

6. The electronic device of claim 1, wherein the authority assignment circuitry is further configured to provide the processor key management device with information related to assignment of the authority to access the security subsystem to the application processor in case of assigning the authority to the application processor, and wherein the processor key management device is configured to transmit the first key related to the application processor to the security subsystem, based on the information related to the assignment of the authority to the application processor.

7. The electronic device of claim 1, wherein the authority assignment circuitry is further configured to provide the processor key management device with information related to assignment of the authority to access the security subsystem to the communication processor in case of assigning the authority to the communication processor, and wherein the processor key management device is further configured to transmit the second key related to the communication processor to the security subsystem, based on the information related to the assignment of the authority to the communication processor.

8. An operating method of an electronic device comprising memory, an application processor, a communication processor, a security subsystem, and authority assignment circuitry, the operating method comprising:

assigning, by the authority assignment circuitry, authority to access the security subsystem configured to process a security function to the application processor or the communication processor;

obtaining, from a processor key management device of the security subsystem, a key related to the application processor or the communication processor based on the assigning of the authority to access the security subsystem to the application processor or the communication processor;

processing a security function related to the application processor or the communication processor through the security subsystem, based on the key related to the application processor or the communication processor;

initializing data related to the application processor or the communication processor, based on returning the authority to access the security subsystem assigned to the application processor or the communication processor;

when the communication processor is assigned the authority of the access to the security subsystem from the authority assignment circuitry, running a timer configured to run for a designated reference time;

when the timer expires, transmitting a request signal returning the authority of the access to the security subsystem to the authority assignment circuitry regardless of a state of completion of the processing of the security function; and when a signal related to the assignment of the authority to access the security subsystem is received from the authority assignment circuitry, resetting the timer.

9. The method of claim 8, wherein the assigning to the application processor or the communication processor comprises alternately assigning the authority to access the security subsystem to the application processor or the communication processor in case of receiving a plurality of request signals related to the authority to access the security subsystem from the application processor and the communication processor.

10. The method of claim 8, wherein the assigning to the application processor or the communication processor comprises assigning the authority to access the security subsystem to the application processor or the communication processor, based on time of receiving an access request in case of receiving a request signal related to the authority to access the security subsystem from the application processor and/or the communication processor.

11. The method of claim 8, wherein the assigning to the application processor or the communication processor comprises assigning the authority to access the security subsystem to the application processor or the communication processor, based on priority in the authority to access the security subsystem in case of receiving a plurality of request signals related to the authority to access the security subsystem from the application processor and the communication processor.

12. The method of claim 8, wherein the initializing of the data comprises:

deleting a first key related to the application processor and data related to the security function of the application processor in case of receiving information related to return of the authority to access the security subsystem assigned to the application processor from the authority assignment circuitry; and deleting a second key related to the communication processor and data related to the security function of the communication processor in case of receiving information related to return of the authority to access the security subsystem assigned to the communication processor from the authority assignment circuitry.

13. The method of claim 8, wherein the obtaining of the key related to the communication processor comprises obtaining a root key related to the communication processor through a processor key management device separate from the security subsystem in case that the authority to access the security subsystem is assigned to the communication processor.

14. The method of claim 8, further comprising:

obtaining a root key related to the application processor through a processor key management device separate from the security subsystem in case that the authority to access the security subsystem is assigned to the application processor; and processing the security function related to the application processor through the security subsystem, based on the key related to the application processor.

15. The method of claim 8, further comprising:

providing, by the authority assignment circuitry, the processor key management device with information related to assignment of the authority to access the security subsystem to the application processor in case of assigning the authority to the application processor; and transmitting, by the processor key management device, the key related to the application processor to the security subsystem, based on the information related to the assignment of the authority to the application processor.

16. The method of claim 8, further comprising:

upon completion of the processing of the security function, transmitting a request from the application processor to the authority assignment circuitry, the request indicating return of authority to the authority assignment circuitry.

17. The method of claim 16, further comprising:

withdrawing, by the authority assignment circuitry, authority to access the security function by the application processor or the communication processor; and transmitting, from the authority assignment circuitry to the application processor, information indicating that the authority to access the security function has been returned.

18. One or more non-transitory computer-readable storage media storing one or more computer programs including computer-executable instructions that, when executed by one or more processors of an electronic device individually or collectively, cause the electronic device to perform operations, the operations comprising:

assigning authority to access a security subsystem configured to process a security function to an application processor of the electronic device or a communication processor of the electronic device;

obtaining a key related to the application processor or the communication processor based on the assigning of the authority to access the security subsystem to the application processor or the communication processor;

processing a security function related to the application processor or the communication processor through the security subsystem, based on the key related to the application processor or the communication processor;

initializing data related to the application processor or the communication processor, based on returning the authority to access the security subsystem assigned to the application processor or the communication processor;

when the communication processor is assigned the authority of the access to the security subsystem from authority assignment circuitry, running a timer configured to run for a designated reference time;

when the timer expires, transmitting a request signal returning the authority of the access to the security subsystem to the authority assignment circuitry regardless of a state of completion of the processing of the security function; and when a signal related to the assignment of the authority to access the security subsystem is received from the authority assignment circuitry, resetting the timer.

19. The one or more non-transitory computer-readable storage media of claim 18, the operations further comprising:

obtaining a root key related to the application processor through a processor key management device separate from the security subsystem in case that the authority to access the security subsystem is assigned to the application processor; and processing the security function related to the application processor through the security subsystem, based on the key related to the application processor.

20. The electronic device of claim 1, wherein the instructions, when executed, cause the electronic device to:

when the application processor is assigned the authority of the access to the security subsystem from the authority assignment circuitry, perform, via the security subsystem, the security function related to the application processor, after the security function is completed, transmit a request signal returning the authority of the access to the security subsystem to the authority assignment circuitry.

* * * * *